United States Patent
Houghton et al.

(10) Patent No.: US 11,917,538 B2
(45) Date of Patent: Feb. 27, 2024

(54) DYNAMIC PARAMETERS FOR MULTI-USER CHANNEL ACCESS

(71) Applicant: QUALCOMM Incorporated, San Diego, CA (US)

(72) Inventors: Nathaniel David Houghton, Fremont, CA (US); Xiaolong Huang, San Jose, CA (US); Ruiqing Ye, Alviso, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/204,530

(22) Filed: Mar. 17, 2021

(65) Prior Publication Data

US 2021/0345239 A1   Nov. 4, 2021

Related U.S. Application Data

(60) Provisional application No. 63/017,638, filed on Apr. 29, 2020.

(51) Int. Cl.
*H04W 52/02* (2009.01)
*H04W 80/02* (2009.01)
(Continued)

(52) U.S. Cl.
CPC ... *H04W 52/0206* (2013.01); *H04W 28/0268* (2013.01); *H04W 28/0278* (2013.01); *H04W 40/244* (2013.01); *H04W 80/02* (2013.01)

(58) Field of Classification Search
CPC ......... H04W 52/0206; H04W 28/0268; H04W 28/0278; H04W 40/244; H04W 80/02;
(Continued)

(56) References Cited

U.S. PATENT DOCUMENTS 9,154,312 B2   10/2015 Katar et al.
11,330,519 B1 *   5/2022 Shukla ............... H04W 12/06
(Continued)

FOREIGN PATENT DOCUMENTS

EP         3579081 A1    12/2019
JP      2009100475 A  *   5/2009
WO  WO-2013184694 A1    12/2013

OTHER PUBLICATIONS

International Search Report and Written Opinion—PCT/US2021/022931—ISA/EPO—dated Jul. 7, 2021.

*Primary Examiner* — Mandish K Randhawa
(74) *Attorney, Agent, or Firm* — Holland & Hart / Qualcomm

(57) ABSTRACT

This disclosure provides systems, methods, and apparatus, including computer programs encoded on computer storage media, for wireless communication. In some implementations, a wireless communication device obtains one or more indications that a wireless station (STA) will enter a power-save mode, selects, for each respective STA of a plurality of STAs, a duration associated with the respective STA entering the power-save mode, and adjusts one or more parameters of a multi-user channel access mechanism for transmitting uplink data associated with the selected duration. In some other implementations, a wireless communication device outputs one or more indications that the device will enter a power-save mode, outputs or obtains data at each of a plurality of first instances, enters the power-save mode at each of a plurality of second instances, and obtains a beacon indicating one or more parameters to be used for a multi-user channel access mechanism for transmitting uplink data.

32 Claims, 12 Drawing Sheets

(51) Int. Cl.
*H04W 40/24* (2009.01)
*H04W 28/02* (2009.01)

(58) Field of Classification Search
CPC ........... H04W 52/0229; H04W 52/028; H04W 28/0221; H04W 52/0219; H04W 28/18; H04W 52/0216; H04W 74/0808; H04W 74/06; Y02D 30/70
See application file for complete search history.

(56) References Cited

U.S. PATENT DOCUMENTS

| | | |
|---|---|---|
| 2003/0224775 A1 | 12/2003 | Suda et al. |
| 2008/0207278 A1 | 8/2008 | Qi et al. |
| 2013/0329614 A1* | 12/2013 | Thakur ............. H04W 52/0216 370/311 |
| 2014/0254450 A1 | 9/2014 | Wentink et al. |
| 2017/0041961 A1* | 2/2017 | Zou ......................... H04L 47/27 |
| 2017/0078003 A1* | 3/2017 | Ghosh ................... H04W 74/04 |
| 2017/0272138 A1* | 9/2017 | Chun ..................... H04L 1/1614 |
| 2019/0379342 A1 | 12/2019 | Weber et al. |

* cited by examiner

DYNAMIC PARAMETERS FOR MULTI-USER CHANNEL ACCESS

CROSS-REFERENCE TO RELATED APPLICATIONS

This Patent Application claims priority to U.S. Provisional Patent Application No. 63/017,638 entitled "DYNAMIC PARAMETERS FOR MULTI-USER CHANNEL ACCESS" and filed on Apr. 29, 2020, which is assigned to the assignee hereof. The disclosures of all prior Applications are considered part of and are incorporated by reference in this Patent Applications.

TECHNICAL FIELD

This disclosure relates generally to wireless networks, and to a multi-user (MU) channel access mechanism for a shared wireless medium.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Wireless networks may use random channel access mechanisms to control access to a shared wireless medium. In such wireless networks, wireless devices (including APs and STAs) typically contend with each other using carrier sense multiple access with collision avoidance (CSMA/CA) techniques to gain access to the wireless medium. In general, the wireless device that randomly selects the lowest backoff number wins the medium access contention operation, and may be granted access to the wireless medium for a period of time commonly referred to as a transmit opportunity (TXOP). Other wireless devices are generally not permitted to transmit during the TXOP to avoid interfering with transmissions from the TXOP owner.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method may be performed by an apparatus of a wireless access point (AP). The method includes receiving, from each respective wireless station (STA) of a plurality of STAs associated with the AP, one or more indications that the respective STA will enter a power-save mode. The method further includes selecting, for each respective STA of the plurality of STAs, a duration between a first instance at which the respective STA transmits or receives data and a second instance at which the respective STA enters the power-save mode. The method further includes adjusting one or more parameters of a multi-user (MU) channel access mechanism for transmitting uplink (UL) data associated with the selected duration.

In some implementations, the duration is an average duration between a plurality of first instances at which the respective STA transmits or receives data and a corresponding plurality of second instances at which the respective STA enters the power-save mode. In some other implementations, at least one indication of the one or more indications includes a power management (PM) bit carried in a medium access control (MAC) frame, where the PM bit is set to 1. In some instances, the MAC frame is a quality-of-service (QoS) NULL frame. In some other implementations, at least one indication of the one or more indications includes a PM bit carried in a medium access control (MAC) frame, where the PM bit is set to 0, and the method further includes transmitting a Buffer Status Report (BSR) trigger frame that triggers the respective STA to transmit buffer status information upon exiting the power-save mode.

In some instances, the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the respective STA. In some implementations, dynamically adjusting the one or more parameters includes decreasing at least one of the MU EDCA timer value, the AIFSN, the minimum CW size, or the time interval based on the selected duration of at least some STAs of the plurality of STAs being greater than a value. In some instances, the method further includes setting the MU EDCA timer value to a duration, and receiving an unsolicited BSR from at least one STA of the plurality of STAs based on the duration of the MU EDCA timer value exceeding a time period.

In some other implementations, the method further includes adjusting a time interval between trigger frame transmissions to the respective STA based at least in part on the determined duration of the respective STA. In some implementations, the method further includes selecting an average frequency with which the respective STA has queued UL data for transmission to the AP, where dynamically adjusting the one or more parameters is further based on the determined average frequency.

In some implementations, the method further includes estimating a power-save schedule of each respective STA of the plurality of STAs based at least in part on the one or more indications, where dynamically adjusting the one or more parameters is further based on the estimated power-save schedules of the plurality of STAs. In some instances, the estimated power-save schedule of the respective STA is indicative of whether the respective STA transmits its UL data queue size to the AP when exiting the power-save mode, and the method further includes selecting, for the respective STA, an average duration between a first instance at which the respective STA exits the power-save mode and a second instance at which the respective STA transmits its UL data queue size to the AP, including the respective STA in a scheduling candidate set for UL basic triggering when the determined average duration is less than a value, and transmitting a basic trigger frame that triggers the respective STA to transmit UL QoS information upon exiting the power-save mode.

In some instances, the estimated power-save schedule of the respective STA is indicative of whether the respective STA transmits its UL data queue size to the AP when exiting the power-save mode, and the method further includes selecting, for the respective STA, an average duration between a first instance at which the respective STA exits the power-save mode and a second instance at which the respective STA transmits its UL data queue size to the AP, and transmitting a BSR trigger frame that triggers the respective STA to transmit buffer status information upon exiting the power-save mode when the determined average duration is greater than a value. In some other instances, the estimated power-save schedule of the respective STA is indicative of a likelihood that the respective STA has queued UL data.

In some implementations, the method further includes transmitting a basic trigger frame that triggers one or more STAs of the plurality of STAs to transmit UL QoS information upon exiting the power-save mode when the determined duration is less than a value. In some other implementations, the method further includes transmitting a Buffer Status Report (BSR) trigger frame that triggers one or more STAs of the plurality of STAs to transmit buffer status information upon exiting the power-save mode when the determined duration is greater than a value.

Another innovative aspect of the subject matter described in this disclosure can be implemented in a wireless communication device. The wireless communication device may include a processing system coupled to an interface. The interface is configured to obtain one or more indications that a wireless station (STA) will enter a power-save mode. The processing system is configured to select, for each respective STA of a plurality of STAs, a duration between a first instance at which the respective STA transmits or receives data and a second instance at which the respective STA enters the power-save mode. The processing system is further configured to adjust one or more parameters of a multi-user (MU) channel access mechanism for transmitting uplink (UL) data associated with the selected duration.

In some implementations, at least one indication of the one or more indications includes a power management (PM) bit carried in a medium access control (MAC) frame, where the PM bit is set to 1. In some instances, the MAC frame is a quality-of-service (QoS) NULL frame. In some other implementations, at least one indication of the one or more indications includes a PM bit carried in a medium access control (MAC) frame, where the PM bit is set to 0, and where the interface is further configured to output a Buffer Status Report (BSR) trigger frame that triggers the respective STA to transmit buffer status information upon exiting the power-save mode.

In some other implementations, the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the respective STA. In some instances, dynamically adjusting the one or more parameters includes decreasing at least one of the MU EDCA timer value, the AIFSN, the minimum CW size, or the time interval based on the selected duration of at least some STAs of the plurality of STAs being greater than a value. In some implementations, the processing system is further configured to estimate a power-save schedule of each respective STA of the plurality of STAs based at least in part on the one or more indications, where dynamically adjusting the one or more parameters is further based on the estimated power-save schedules of the plurality of STAs.

Another innovative aspect of the subject matter described in this disclosure can be implemented in a method for wireless communication. The method may be performed by an apparatus of a wireless station (STA). The method includes transmitting, to a wireless access point (AP), one or more indications that the STA will enter a power-save mode. The method further includes communicating data at each of a plurality of first instances. The method further includes entering the power-save mode at each of a plurality of second instances. The method further includes receiving, from the AP, a beacon indicating one or more parameters for a multi-user (MU) channel access mechanism for transmitting uplink (UL) data.

In some implementations, at least one parameter of the one or more parameters is configured based on a duration between respective pairs of the first and second instances, and the duration indicates an average duration between respective pairs of the first and second instances. In some instances, at least one indication of the one or more indications includes a power management (PM) bit carried in a medium access control (MAC) frame, where the PM bit is set to 1. In some implementations, the MAC frame is a quality-of-service (QoS) NULL frame.

In some other implementations, at least one indication of the one or more indications includes a PM bit carried in a medium access control (MAC) frame, where the PM bit is set to 0, and the method further includes receiving a Buffer Status Report (BSR) trigger frame that triggers the STA to transmit buffer status information to the AP upon exiting the power-save mode. In some instances, the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the STA. In some implementations, at least one of the MU EDCA timer value, the AIFSN, the minimum CW size, or the time interval is set based on at least one of a duration between respective pairs of the first and second instances being greater than a value, a likelihood that the STA has queued UL data, or an average frequency with which the STA has queued UL data for transmission to the AP.

In some implementations, at least one parameter of the one or more parameters indicates a duration of the MU EDCA timer value, and the method further includes transmitting an unsolicited BSR to the AP based on the duration of the MU EDCA timer value exceeding a time period, where the unsolicited BSR indicates buffer status information for at least one Access Category (AC) unaffected by the MU EDCA timer value. In some instances, at least one of the MU EDCA timer value, the AIFSN, the minimum CW size, or the time interval is set based on an average duration between a first instance at which the STA exits the power-save mode and a second instance at which the STA transmits its UL data queue size to the AP, and the method further includes receiving a basic trigger frame that triggers the STA to transmit UL QoS information to the AP upon exiting the power-save mode when the average duration is less than a value, and receiving a Buffer Status Report (BSR) trigger frame that triggers the STA to transmit buffer status information to the AP upon exiting the power-save mode when the average duration is greater than the value.

In some other implementations, the method further includes increasing a power-save timer in response to receiving trigger frames from the AP when the STA is operating in a first power-save mode and not receiving trigger frames from the AP when the STA is operating in a second power-save mode. In some instances, the method further includes increasing a power-save timer in response to receiving trigger frames from the AP when the STA is operating in a first power-save mode and not receiving trigger frames from the AP when the STA is operating in a second power-save mode.

Another innovative aspect of the subject matter described in this disclosure can be implemented in a wireless communication device. The wireless communication device may include a processing system coupled to an interface. The interface is configured to output one or more indications that the wireless communication device will enter a power-save mode. The interface is further configured to output or obtain data at each of a plurality of first instances. The processing system is further configured to enter the power-save mode at each of a plurality of second instances. The interface is further configured to obtain a beacon indicating one or more parameters to be used for a multi-user (MU) channel access mechanism for transmitting uplink (UL) data.

In some implementations, at least one indication of the one or more indications includes a power management (PM) bit carried in a medium access control (MAC) frame, where the PM bit is set to 1. In some instances, the MAC frame is a quality-of-service (QoS) NULL frame. In some other implementations, at least one indication of the one or more indications includes a PM bit carried in a medium access control (MAC) frame, where the PM bit is set to 0, and where the interface is further configured to obtain a Buffer Status Report (BSR) trigger frame that triggers the wireless communication device to transmit buffer status information upon exiting the power-save mode.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
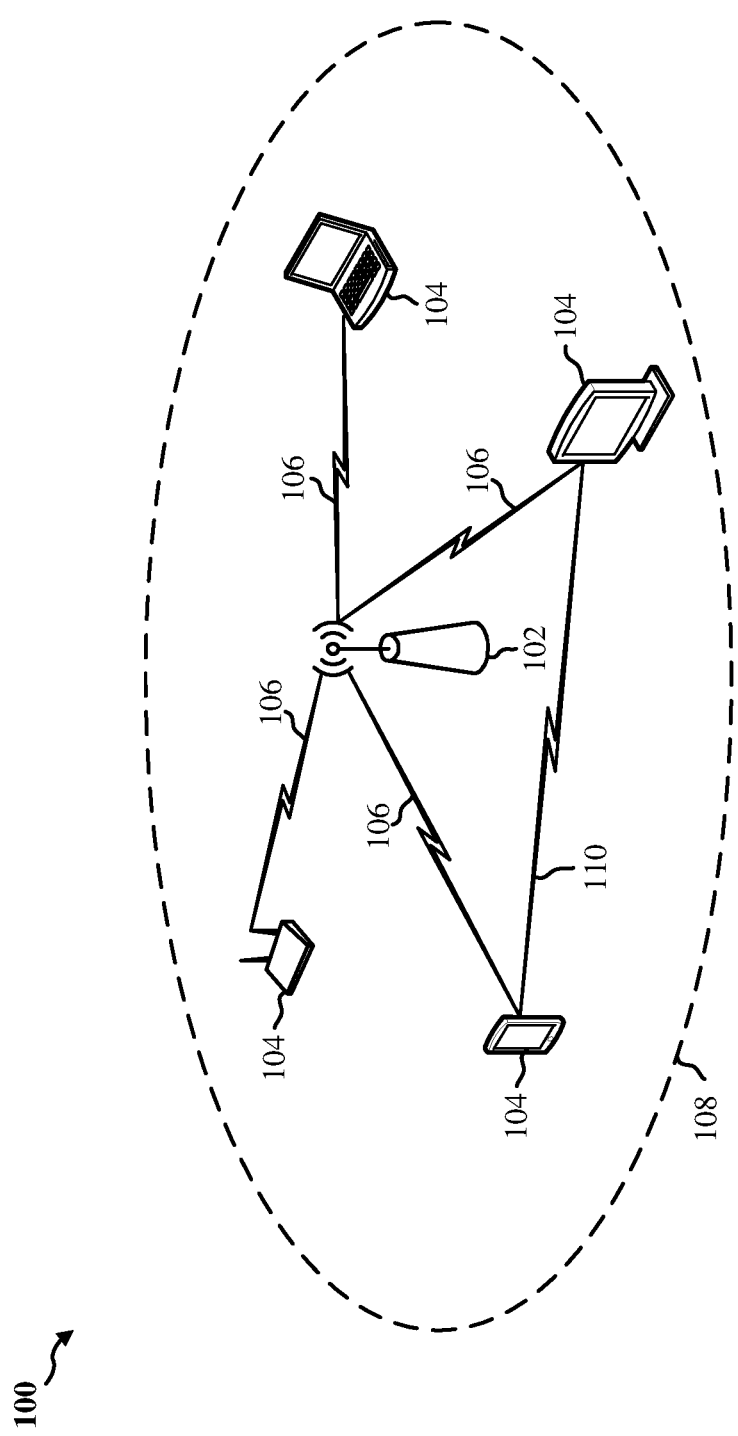
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

When contending for medium access, some wireless communication devices may employ an Enhanced Distributed Channel Access (EDCA) mechanism according to a multi-user (MU) EDCA value, which is typically advertised by an AP in one or more beacons. In some instances, a power-saving STA may wake up from power save mode to listen for beacons and, after receiving a beacon, re-enter the power-save mode for one or more beacon intervals. If the AP sets a relatively high MU EDCA value such that the contention window used for medium access contention operations is relatively long, the STA may enter the power-save mode before the contention window expires (and thus before the STA's backoff counter reaches a zero value). As a result, the STA may not be able to win medium access contention operations, and also may not be awake to receive a trigger frame from the AP after the contention window expires, which may increase network latency. Specifically, the AP may refrain from transmitting a trigger frame to the STA until the AP receives an indication that the STA has buffered UL data, and the STA may refrain from transmitting its buffered UL data to the AP until receiving a trigger frame from the AP, resulting in a deadlock between the AP and the STA that also can increase network latency.

Various implementations relate generally to medium access contention operations on a shared wireless medium. Some implementations more specifically relate to dynamically adjusting parameters of a multi-user (MU) channel access mechanism for transmitting uplink (UL) data based on power-save behaviors of a plurality of STAs associated with the AP. In some implementations, an AP may receive, from each STA of the plurality of STAs, one or more indications that the respective STA will enter a power-save mode. The AP may determine, for each of the STAs, a duration between when the respective STA transmits or receives data and when the respective STA enters the power-save mode. Based on the determined durations, the AP may dynamically adjust one or more parameters of the MU channel access mechanism, such as a MU EDCA value, to increase the likelihood that the STAs are in an awake state long enough to receive the trigger frame, contend for medium access, and transmit UL data to the AP.

In some implementations, the AP may observe other behaviors of the STAs and dynamically adjust the one or more parameters of the MU channel access mechanism accordingly. For example, the AP may determine an average frequency at which a respective STA has queued UL data for transmission to the AP, and adjust at least one of the parameters based on the determined average frequency. As another example, the AP may determine an average frequency at which a respective STA transmits its UL data queue size to the AP when exiting the power-save mode, and adjust at least one of the parameters based on the determined average frequency.

In some implementations, the AP may determine an average duration between when a respective STA exits the power-save mode and when the respective STA transmits UL data queue size information to the AP. In such implementations, if the average duration is less than a value, the AP may transmit a basic trigger frame that triggers the respective STA to transmit UL quality-of-service (QoS) information to the AP upon exiting the power-save mode, for example, so that the AP has an indication of the power save schedule of the respective STA. If the average duration is greater than a value, the AP may transmit a Buffer Status Report (BSR) trigger frame that triggers the respective STA to transmit buffer status information to the AP upon exiting the power-save mode, for example, so that the AP has an indication of the amount of UL data queued in the respective STA.

Particular implementations of the subject matter described in this disclosure can be implemented to realize one or more of the following potential advantages. By dynamically adjusting parameters of a MU channel access mechanism based on power-save behaviors of STAs associated with an AP, the AP may transmit trigger frames at instances during which the STAs are awake, thereby increasing the likelihood that the STAs can transmit UL data to the AP, which in-turn may reduce network latency. Also, by triggering a power-save STA to transmit UL QoS information or buffer status information to the AP upon exiting the power-save mode, the AP and the power-save STA may avoid a transmission deadlock, further reducing network latency. As such, implementations of the subject matter described in this disclosure may be used to reduce network latency for power-save STAs.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistants (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4, 5 and 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control, and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Access to the shared wireless medium is generally governed by a distributed coordination function (DCF). With a DCF, there is generally no centralized master device allocating time and frequency resources of the shared wireless medium. Before a wireless communication device, such as an AP 102 or a STA 104, is permitted to transmit data, it waits for a particular time and contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing (or packet detection (PD)) is accomplished via a measurement of the received signal strength of a valid frame, which is compared to a value to determine whether the channel is busy. For example, if the received signal strength of a detected preamble is above the value, the medium is considered busy. Physical carrier sensing also includes energy detection (ED). Energy detection involves measuring the total energy the wireless communication device receives regardless of whether the received signal represents a valid frame. If the total energy detected is above a value, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that elapses before the wireless communication device may contend for access even in the absence of a detected symbol or even if the detected energy is below the value.

The DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay, and a MAC processing time. Measurements for channel sensing are performed for each slot. All transmissions may begin at slot boundaries. Example varieties of IFS include: the short IFS (SIFS), the distributed IFS (DIFS), the extended IFS (EIFS), or the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be).

When the NAV reaches 0, the wireless communication device performs physical carrier sensing. If the channel remains idle for the appropriate IFS (for example, a DIFS), the wireless communication device initiates a backoff timer, which represents a duration of time that the device senses the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from the corresponding STAs 104 to the AP 102). To support the MU transmissions, the APs 102 and the STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52-tone, 106-tone, 242-tone, 484-tone, and 996-tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or an UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs) and may assign each AID (and thus, each STA 104) one or more RUs that can be used to send UL traffic to the AP 102. The AP also may designate one or more random access (RA) RUs that unscheduled STAs 104 may contend for.

Figure 2:
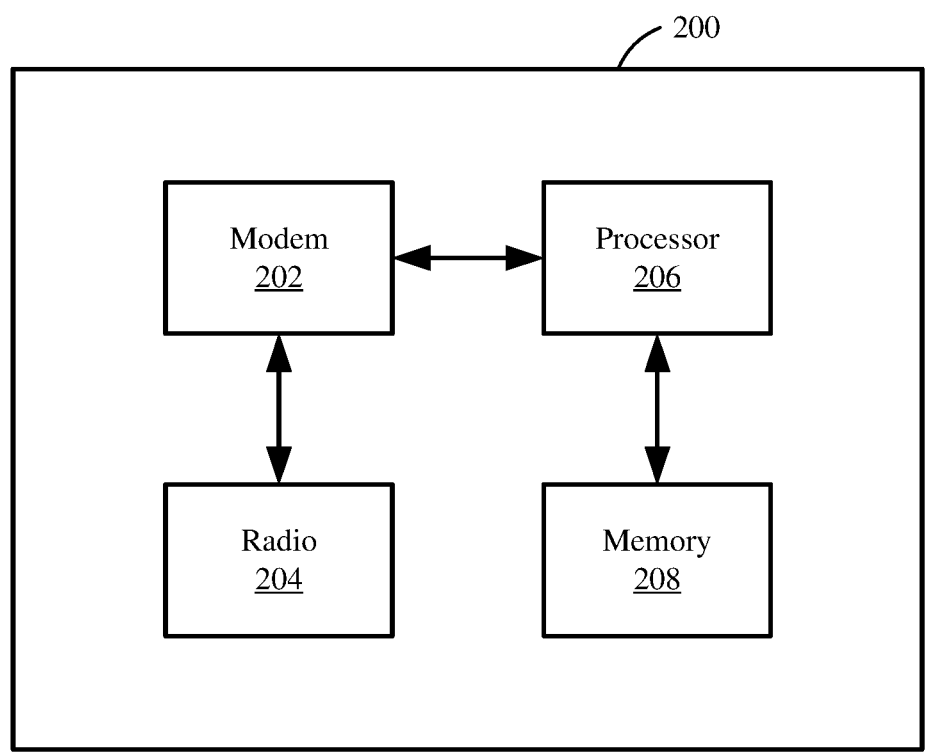
FIG. 2 shows a block diagram of an example wireless communication device.

FIG. 2 shows a block diagram of an example wireless communication device 200. In some implementations, the wireless communication device 200 can be an example of a device for use in a STA such as one of the STAs 104 described with reference to FIG. 1. In some implementations, the wireless communication device 200 can be an example of a device for use in an AP such as the AP 102 described with reference to FIG. 1. The wireless communication device 200 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 200 can be, or can include, a chip, system on chip (SoC), chipset, package, or device that includes one or more modems 202, for example, a Wi-Fi (IEEE 802.11 compliant) modem. In some implementations, the one or more modems 202 (collectively "the modem 202") additionally include a WWAN modem (for example, a 3GPP 4G LTE or 5G compliant modem). In some implementations, the wireless communication device 200 also includes one or more radios 204 (collectively "the radio 204"). In some implementations, the wireless communication device 206 further includes one or more processors, processing blocks, or processing elements 206 (collectively "the processor 206"), and one or more memory blocks or elements 208 (collectively "the memory 208").

The modem 202 can include an intelligent hardware block or device such as, for example, an application-specific integrated circuit (ASIC) among other possibilities. The modem 202 is generally configured to implement a PHY layer. For example, the modem 202 is configured to modulate packets and to output the modulated packets to the radio 204 for transmission over the wireless medium. The modem 202 is similarly configured to obtain modulated packets received by the radio 204 and to demodulate the packets to provide demodulated packets. In addition to a modulator and a demodulator, the modem 202 may further include digital signal processing (DSP) circuitry, automatic gain control (AGC), a coder, a decoder, a multiplexer, and a demultiplexer. For example, while in a transmission mode, data obtained from the processor 206 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 204. In implementations involving beamforming, the modulated symbols in the respective spatial streams are precoded via a steering matrix prior to their provision to the IFFT block.

While in a reception mode, digital signals received from the radio 204 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 206) for processing, evaluation, or interpretation.

The radio 204 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 202 are provided to the radio 204, which transmits the symbols via the coupled antennas. Similarly, symbols received via the antennas are obtained by the radio 204, which provides the symbols to the modem 202.

The processor 206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 206 processes information received through the radio 204 and the modem 202, and processes information to be output through the modem 202 and the radio 204 for transmission through the wireless medium. For example, the processor 206 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 206 may generally control the modem 202 to cause the modem to perform various operations described herein.

The memory 204 can include tangible storage media such as random-access memory (RAM) or read-only memory (ROM), or combinations thereof. The memory 204 also can store non-transitory processor- or computer-executable software (SW) code containing instructions that, when executed by the processor 206, cause the processor to perform various operations described herein for wireless communication, including the generation, transmission, reception, and interpretation of MPDUs, frames, or packets. For example, various functions of components disclosed herein, or various blocks or steps of a method, operation, process, or algorithm disclosed herein, can be implemented as one or more modules of one or more computer programs.

Figure 3B:
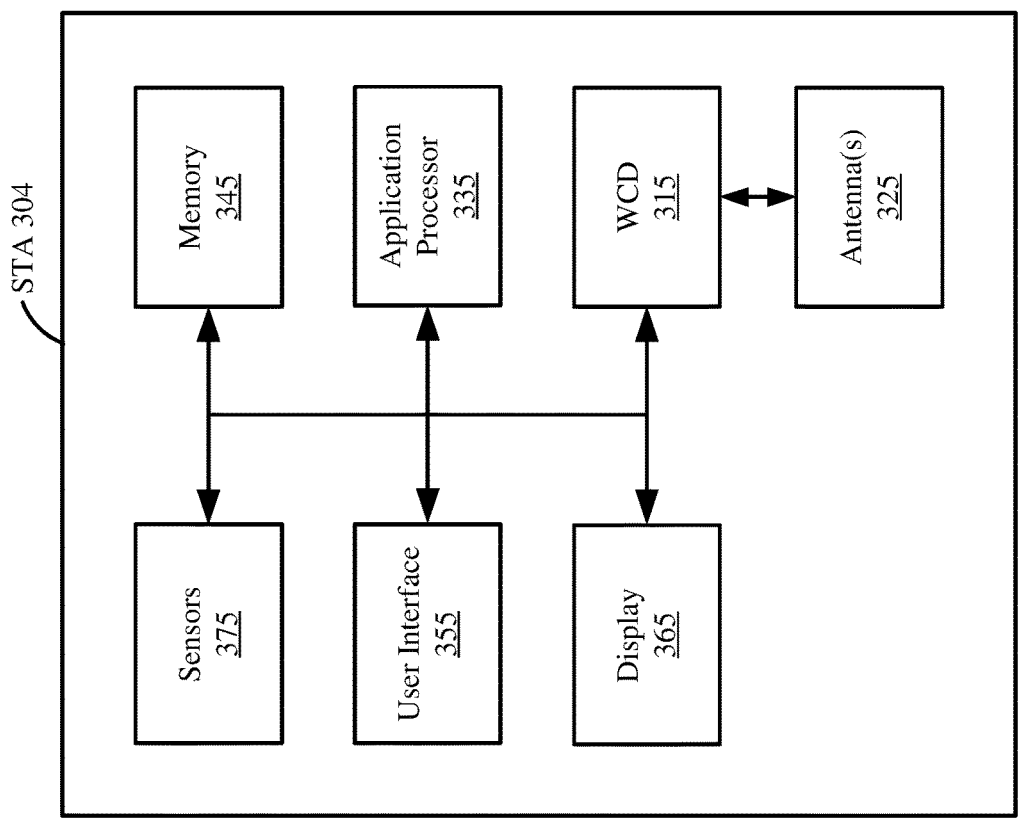
FIG. 3B shows a block diagram of an example station (STA).
Figure 3A:
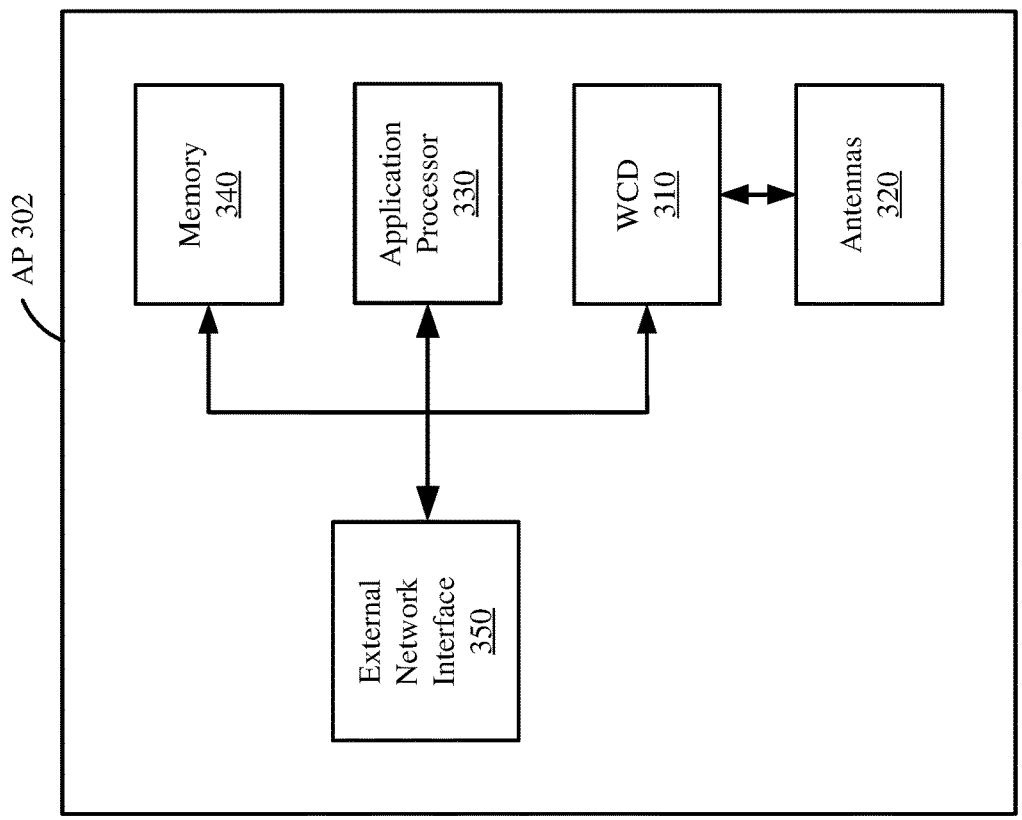
FIG. 3A shows a block diagram of an example access point (AP).

FIG. 3A shows a block diagram of an example AP 302. For example, the AP 302 can be an example implementation of the AP 102 described with reference to FIG. 1. The AP 302 includes a wireless communication device (WCD) 310 (although the AP 302 may itself also be referred to generally as a wireless communication device as used herein). For example, the wireless communication device 310 may be an example implementation of the wireless communication device 200 described with reference to FIG. 2. The AP 302 also includes multiple antennas 320 coupled with the wireless communication device 310 to transmit and receive wireless communications. In some implementations, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Ones of the aforementioned components can communicate with other ones of the components directly or indirectly, over at least one bus. The AP 302 further includes a housing that encompasses the wireless communication device 310, the application processor 330, the memory 340, and at least portions of the antennas 320 and external network interface 350.

In some implementations, the application processor 330 may be a component of a processing system. A processing system may generally refer to a system or series of machines or components that receives inputs and processes the inputs to produce a set of outputs (which may be passed to other systems or components of, for example, the AP 302). For example, a processing system of the AP 302 may refer to a system including the various other components or subcomponents of the AP 302.

The processing system of the AP 302 may interface with other components of the AP 302, and may process information received from other components (such as inputs or signals), output information to other components, and the like. For example, a chip or modem of the AP 302 may include a processing system, a first interface to output information, and a second interface to obtain information. In some instances, the first interface may refer to an interface between the processing system of the chip or modem and a transmitter, such that the AP 302 may transmit information output from the chip or modem. In some instances, the second interface may refer to an interface between the processing system of the chip or modem and a receiver, such that the AP 302 may obtain information or signal inputs, and the information may be passed to the processing system. A person having ordinary skill in the art will readily recognize that the first interface also may obtain information or signal inputs, and the second interface also may output information or signal outputs.

FIG. 3B shows a block diagram of an example STA 304. For example, the STA 304 can be an example implementation of the STA 104 described with reference to FIG. 1. The STA 304 includes a wireless communication device 315 (although the STA 304 may itself also be referred to generally as a wireless communication device as used herein). For example, the wireless communication device 315 may be an example implementation of the wireless communication device 200 described with reference to FIG. 2. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some implementations, the STA 304 further includes a user interface (UI) 355 (such as a touchscreen or keypad) and a display 365, which may be integrated with the UI 355 to form a touchscreen display. In some implementations, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365.

In some implementations, the application processor 335 may be a component of a processing system. A processing system may generally refer to a system or series of machines or components that receives inputs and processes the inputs to produce a set of outputs (which may be passed to other systems or components of, for example, the STA 304). For example, a processing system of the STA 304 may refer to a system including the various other components or subcomponents of the STA 304.

The processing system of the STA 304 may interface with other components of the STA 304, and may process information received from other components (such as inputs or signals), output information to other components, and the like. For example, a chip or modem of the STA 304 may include a processing system, a first interface to output information, and a second interface to obtain information. In some instances, the first interface may refer to an interface between the processing system of the chip or modem and a transmitter, such that the STA 304 may transmit information output from the chip or modem. In some instances, the second interface may refer to an interface between the processing system of the chip or modem and a receiver, such that the STA 304 may obtain information or signal inputs, and the information may be passed to the processing system. A person having ordinary skill in the art will readily recognize that the first interface also may obtain information or signal inputs, and the second interface also may output information or signal outputs.

As mentioned, wireless communication devices may contend with each other for access to a shared wireless medium. The IEEE 802.11 standards define a distributed coordination function (DCF) in which wireless communication devices use carrier sensing techniques to determine that the wireless medium has been idle for a period of time before attempting to transmit data on the wireless medium. Many wireless communication devices employ an Enhanced Distributed Channel Access (EDCA) mechanism for medium access contention operations. The EDCA mechanism is an example of a listen-before-talk (LBT) channel access mechanism, and may prevent multiple devices from accessing the wireless medium at the same time by arbitrating access to the wireless medium using randomly selected numbers representing periods of time during which the wireless medium is to remain idle before a given wireless communication device may transmit on the wireless medium. The EDCA mechanism also provides a number of quality-of-service (QoS) enhancements for prioritizing the flow of data traffic in a network, for example, by defining the four access categories (ACs): voice (AC_VO), video (AC_VI), background (AC_BK), and best effort (AC_BE).

As the number of wireless communication devices associated with an AP increases, the likelihood of collisions on the wireless medium also increases, which may decrease throughput of the wireless network. The ability to provide a certain quality-of-service (QoS) in a wireless network may depend on the throughput of the wireless network. Decreases in either UL throughput or DL throughput of the wireless network may reduce an AP's ability to guarantee certain levels of QoS for time-critical traffic flows (such as voice and video calls). Further, the presence of legacy devices that do not support multiple-access communication schemes (such as Orthogonal Frequency-Division Multiple Access (OFDMA) modulation schemes) in a wireless network may decrease DL throughput to a greater extent than UL throughput, and may therefore exacerbate imbalances between UL and DL throughput of the wireless network. Imbalances between UL and DL throughput may limit or restrict the number of bi-directional symmetric traffic flows (such as voice and video calls) that can be supported by a wireless network for a given number of associated devices.

Figure 4:
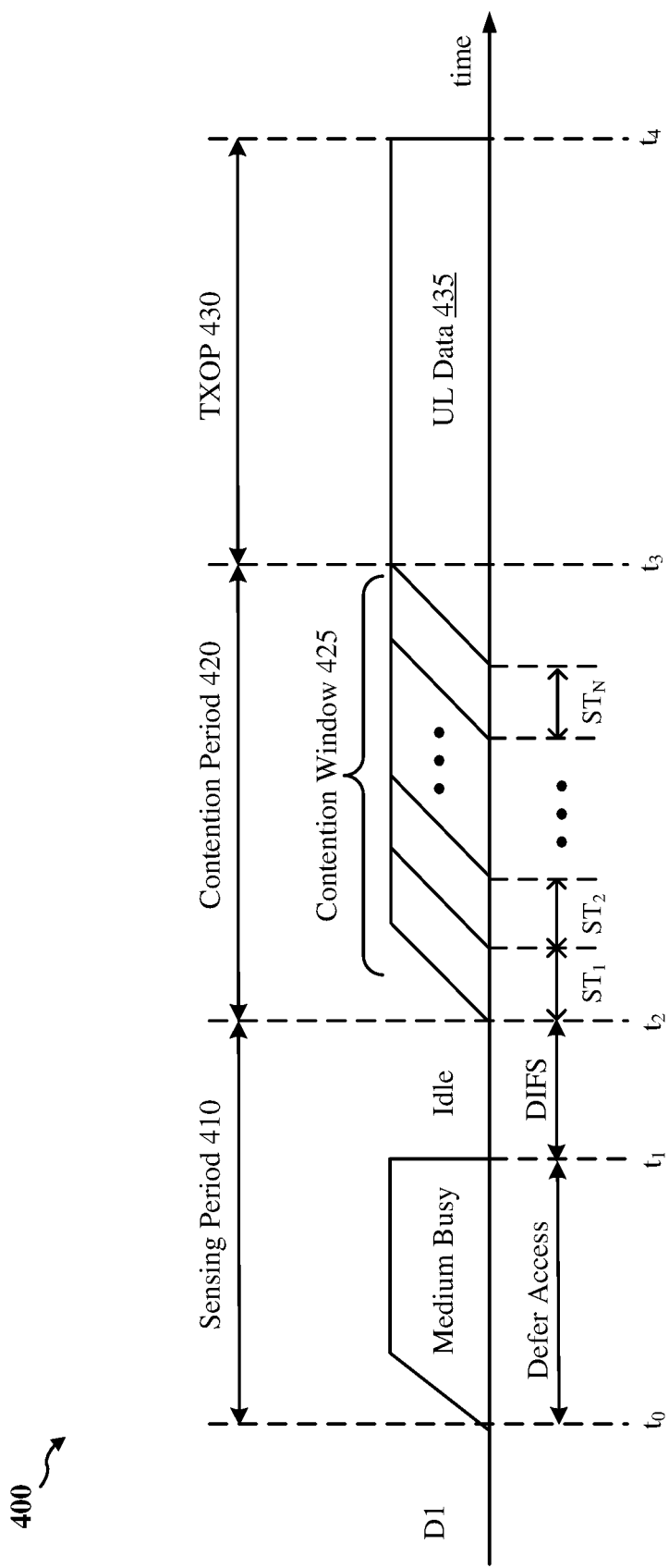
FIG. 4 shows a timing diagram illustrating the transmissions of communications.

FIG. 4 shows a timing diagram 400 illustrating the transmissions of communications. The communications may relate to medium access contention operations. In some implementations, the wireless communication device D1 described with reference to FIG. 4 may operate as or within a STA, such as one of the STAs 104 and 304 described with reference to FIGS. 1 and 3B, respectively. In some other implementations, the wireless communication device D1 may operate as or within an AP, such as one of the APs 102 and 302 described with reference to FIGS. 1 and 3A, respectively.

In some implementations, the device D1 and one or more other wireless devices (not shown for simplicity) may contend for medium access using an EDCA mechanism, which may be implemented through the use of CSMA/CA and timing intervals such as SIFS, DIFS, EIFS, and AIFS. For example, the device D1 may randomly select or generate a backoff number from a range of numbers defined by a contention window (CW), and may set its backoff counter to an initial value based on the randomly selected backoff number. The size of the contention window may be initially set to a minimum value ($CW_{min}$), for example, such that the backoff number is randomly selected from a range of numbers between 0 and $CW_{min}$.

The device D1 may sense the wireless medium, and decrement its backoff counter by one slot each time the wireless medium is continuously idle for an appropriate IFS period (such as a DIFS period). When the backoff counter reaches zero, the device D1 may become the owner of a TXOP and transmit UL data on the wireless medium for a duration of the TXOP. If there is a collision on the wireless medium, the device D1 may use an exponential backoff procedure in which the CW size is doubled for each subsequent medium access contention operation. When the contention window reaches a maximum value ($CW_{max}$), the contention window size remains at $CW_{max}$ until one of the contending devices wins access to the shared wireless medium. The one or more other wireless devices contending for medium access follow a similar procedure and decrement their backoff counters from randomly selected backoff numbers between 0 and $CW_{min}$ each time the wireless medium is sensed to be idle for the appropriate IFS period.

With reference to FIG. 4, at time $t_0$, a sensing period 410 begins during which the device D1 senses or determines whether the wireless medium is idle or busy. The device D1 senses that the wireless medium is busy between times $t_0$ and $t_1$, and may defer medium access contention operations. The wireless medium becomes free at time $t_1$, and remains idle until at least time $t_2$. The device D1 senses that the wireless medium has been continuously idle for a DIFS period between times $t_1$ and $t_2$, decrements its backoff counter by one slot, and enters a contention period 420 at time $t_2$.

During the contention period 420, the device D1 may contend with the one or more other wireless devices for medium access. The device D1 and each of the one or more other wireless devices waits for a period of time determined by their respective randomly selected backoff numbers before attempting to transmit on the wireless medium. Each of the randomly selected backoff numbers may be one of a number of slot times $ST_1$-$ST_N$ within a contention window 425, and may indicate a backoff period for a corresponding one of the contending devices. The contending device that selects the lowest backoff number has the shortest backoff period, and "wins" the medium access contention operation. For the example of FIG. 4, the device D1 selected the lowest backoff number (which corresponds to the earliest one of the slot times $ST_1$-$ST_N$), and becomes the owner of a TXOP 430 on the wireless medium. The device D1 may transmit UL data 435 on the wireless medium for a duration of the TXOP 430 between times $t_3$ and $t_4$.

Figure 5:
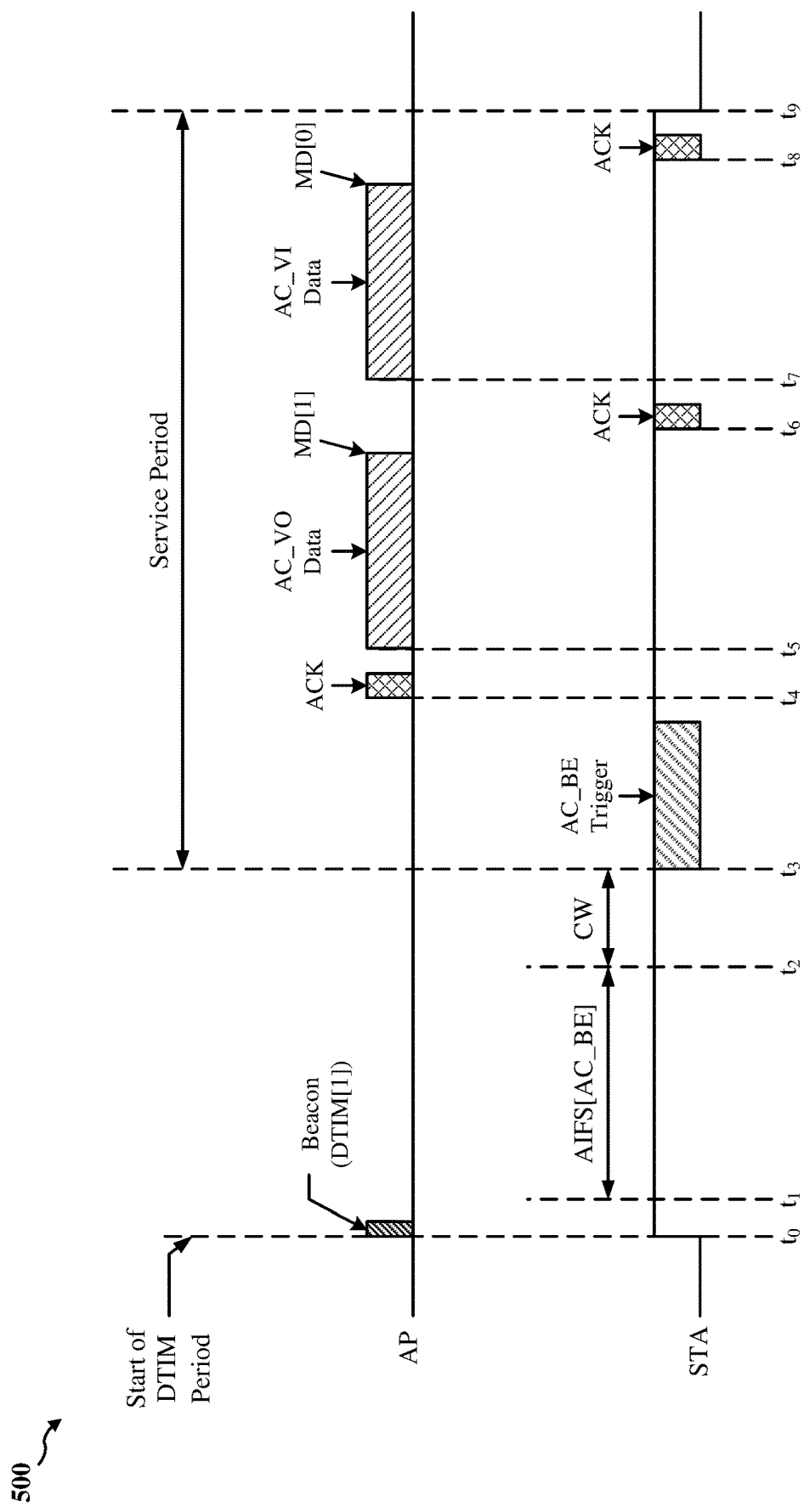
FIG. 5 shows a timing diagram illustrating the transmissions of communications.

FIG. 5 shows a timing diagram 500 illustrating the transmissions of communications. In some implementations, a first wireless communication device ("AP") described with reference to FIG. 5 may operate as or within an AP, such as one of the APs 102 and 302 described with reference to FIGS. 1 and 3A, respectively, and a second wireless communication device ("STA") may operate as or within a STA, such as one of the STAs 104 and 304 described with reference to FIGS. 1 and 3B, respectively. In some implementations, the communications of FIG. 5 may relate to the retrieval of data having different priority levels or assigned to different traffic identifiers (TIDs). Each TID indicates a priority level of the data, and may be mapped to one of the four access categories: voice (AC_VO), video (AC_VI), "best effort" (AC_BE), and background (AC_BK). With respect to FIG. 5, it is assumed that all ACs of the STA are enabled for Unscheduled Automatic Power Save Delivery (U-APSD). The U-APSD mechanism allows a STA to retrieve DL data from an AP using trigger frames that initiate an unscheduled service period with the AP at any time (such as without waiting for a beacon frame).

At time $t_0$, the AP broadcasts a beacon frame carrying a delayed traffic indication map (DTIM), which may indicate the start of a DTIM period. The STA wakes up from an idle state at the start of the DTIM period to receive the beacon frame and decode the DTIM. If the AP asserts the DTIM bit corresponding to the STA, the STA may determine that the AP has buffered DL data for delivery to the STA.

After decoding the DTIM and determining the presence of buffered DL data in the AP, the STA contends for medium access in order to retrieve or request the DL data from the AP. In some implementations, the STA may use a trigger frame of a lower-priority than the buffered DL data to initiate the delivery of DL data, for example, to increase the duration of the STA's backoff period when the AP sets the MU EDCA timer to a relatively high value. Specifically, although AC_VO and AC_VI data are buffered in the AP, the STA may use an AC_BE trigger frame to retrieve the DL data from the AP. The AC_BE trigger frame can retrieve data of the same or higher priority, and thus can initiate the DL delivery of AC_BE data, AC_VI data, and AC_VO data.

Accordingly, when contending for medium access, the STA may determine to wait an AIFS duration associated with AC_BE data, rather than the AIFS duration associated with AC_VI and AC_VO data. The AIFS duration may be based on the AIFS number (AIFSN), the slot time (ST), and a Short Interframe Space (SIFS) duration. The AIFSN may be based on the access category to which the transmit data is assigned. In general, the AIFS duration may be expressed as AIFS=AIFSN[AC]*ST+SIFS, where AIFSN[AC] is the AIFS number for the access category (such as AC_BE) of the transmit data.

At time $t_3$, the STA wins access to the shared medium and transmits an AC_BE trigger frame to the AP, which initiates an unscheduled service period (such as from time $t_3$-$t_9$) during which the AP may deliver AC_BE data, AC_VI data, and AC_VO data to the STA. In some implementations, the AC_BE trigger frame may be a QoS Null frame that is identified or otherwise associated with the best-effort access category. The AP responds to the AC_BE trigger by sending an acknowledgement (ACK) frame back to the STA (such as at time $t_4$), followed by the buffered DL data.

The AP sends an AC_VO data frame to the STA (such as at time $t_5$) and waits for an acknowledgement from the STA. A "more data" bit may be asserted (MD[1]) with the AC_VO data frame, indicating that the AP has additional data to send to the STA. The STA responds to the AC_VO data frame by sending an ACK frame back to the AP (such as at time $t_6$) confirming receipt of the AC_VO data frame. The AP sends an AC_VI data frame to the STA (such as at time $t_7$) and again waits for an acknowledgement from the STA. A more data bit may be deasserted (MD[0]) in the AC_VI data frame, indicating that the AP has no additional data to send to the STA. The STA responds to the AC_VI data frame by sending an ACK frame to the AP (such as at time $t_8$) and subsequently returns to a low-power idle state (such as at time $t_9$), thus ending the service period.

Figure 6:
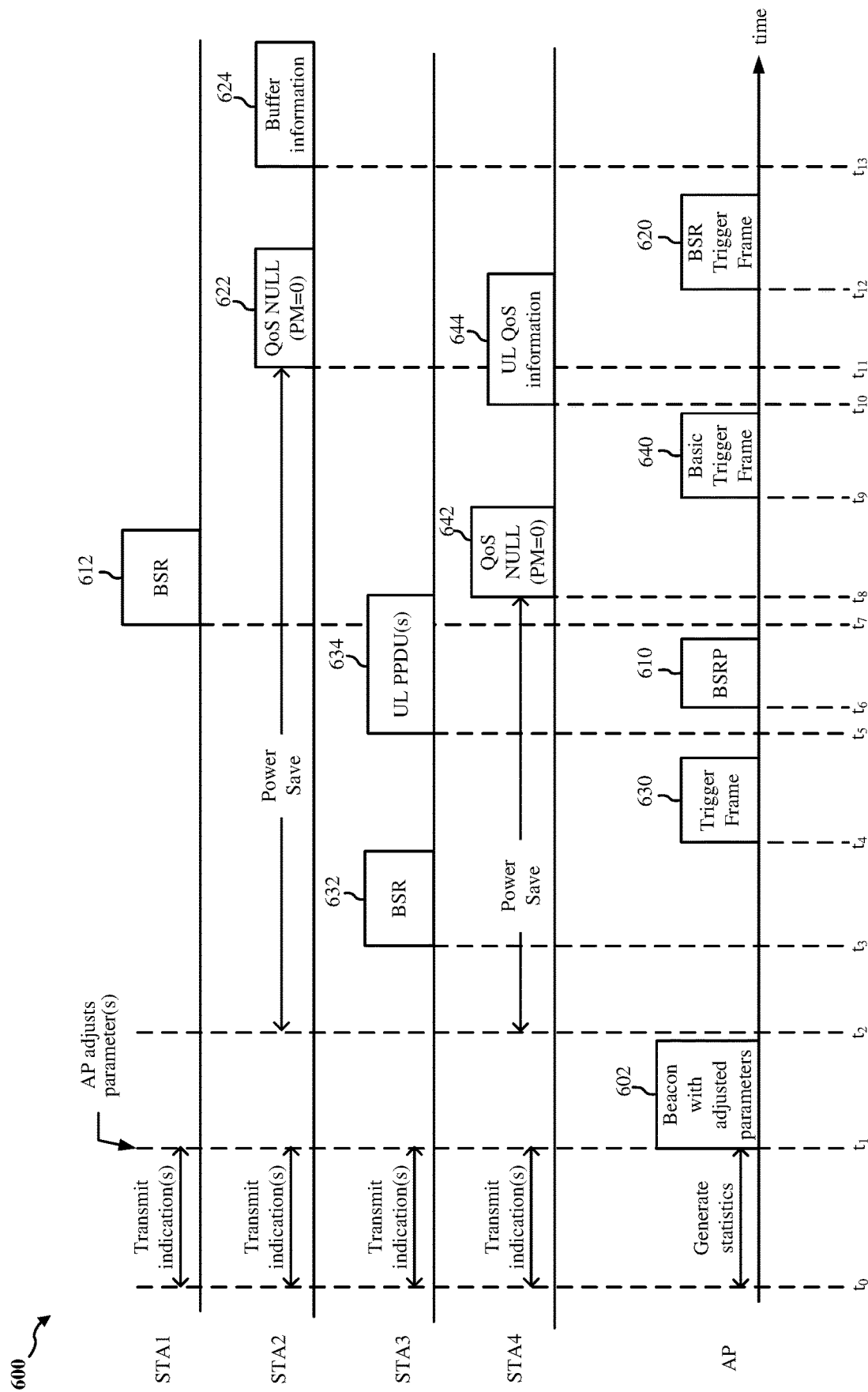
FIG. 6 shows a timing diagram illustrating the transmissions of communications.

FIG. 6 shows a timing diagram 600 illustrating the transmissions of communications. The communications may relate to MU channel access. In some implementations, a first wireless communication device ("AP") described with reference to FIG. 6 may operate as or within an AP, such as one of the APs 102 and 302 described with reference to FIGS. 1 and 3A, respectively, and each of a plurality of wireless communication devices (such as STA1-STA4) may operate as or within a STA, such as one of the STAs 104 and 304 described with reference to FIGS. 1 and 3B, respectively. Although the example of FIG. 6 shows four STAs associated with the AP, any number of STAs may be associated with the AP. At least some of the STAs may be capable of operating in a power-save mode.

Prior to time $t_0$, each of STA1-STA4 ("the STAs") associates with the AP. Between time $t_0$ and time $t_1$, each of the STAs transmits a number of packets, such as a number of UL PPDUs, receives a number of packets, such as a number of DL PPDUs, or both. Also between time $t_0$ and time $t_1$, each of the STAs enters a power-save mode and exits the power-save mode some number of times. In the example of FIG. 6, the AP receives, from each respective STA, one or more indications that the respective STA will enter a power-save mode. In some implementations, one or more of the indications is a power management (PM) bit carried in a quality-of-service (QoS) NULL packet. A respective STA may set the PM bit to 1 to indicate that it will enter a power-save mode.

Also between time $t_0$ and time $t_1$, the AP may generate, for each respective STA, behavioral statistics that indicate a power-save behavior of the respective STA. For example, the AP may determine, for each respective STA, a duration between a first instance at which the respective STA transmits or receives data—such as within a QoS NULL packet—and a second instance at which the respective STA enters the power-save mode. The duration may be fixed, may vary, or both, for each respective STA. In some instances, the duration may be on the order of milliseconds (ms).

In some implementations, the AP may determine, for each respective STA, an average duration between when a plurality of first instances at which the respective STA transmits or receives data and a corresponding plurality of second instances at which the respective STA enters the power-save mode. The AP may estimate a power-save schedule for each respective STA based on the average duration. In some implementations, rather than determining an average duration for reach respective STA, the AP may generate a parameterized duration for each respective STA and estimate a power-save schedule for each respective STA based on the parameterized duration.

Based on the generated statistics, the AP may adjust one or more parameters of a multi-user (MU) channel access mechanism for transmitting uplink (UL) data based on the generated behavioral statistics and transmit a beacon 602 that advertises the one or more adjusted parameters. For example, the one or more parameters may include at least one of a MU Enhanced Distributed Channel Access (EDCA) timer value, an arbitration inter-frame spacing number (AIFSN), a minimum contention window (CW) size ($CW_{Min}$), or a maximum CW size ($CW_{Max}$).

In some implementations, the AP may determine a percentage of STAs that enter the power-save mode within a particular duration (such as 10 ms) after transmitting or receiving data based on the determined average durations. If the percentage is greater than a value, the AP may decrease at least one of the MU EDCA timer value, the AIFSN, the minimum CW size, or the maximum CW size. If the percentage is less than a value, the AP may refrain from adjusting the one or more parameters, or in some instances, the AP may increase at least one of the parameters. As a non-limiting example, if the AP determines that greater than 75% of the STAs enter the power-save mode within 20 ms after transmitting or receiving data, the AP may decrease the MU EDCA timer value such that the greater than 75% of STAs may contend for medium access more frequently, thereby, decreasing overall network latency. As another non-limiting example, the AP may determine that less than 25% of the STAs enter the power-save mode in less than 10 ms after transmitting or receiving data. In such instances, based on the AP's TBTT schedule, the AP may refrain from decreasing the MU EDCA timer value. In some of such instances, the AP may decrease overall network latency by increasing the MU EDCA timer value.

In some implementations, also between time $t_0$ and time $t_1$, the AP may determine at least one of: (i) an average frequency at which a respective STA has UL data queued for transmission to the AP; (ii) an average frequency at which the respective STA transmits its UL data queue size to the AP when exiting the power-save mode; or (iii) an average duration between when the respective STA exits the power-save mode and when the respective STA transmits its UL data queue size to the AP, in addition, or in the alternative, to (iv) the average duration between when the respective STA transmits or receives data and when the respective STA enters the power-save mode, as described herein, and adjust the one or more parameters based on at least one of (i), (ii), (iii), or (iv). At time $t_1$, the AP may transmit a beacon 602 advertising the one or more adjusted parameters. The AP and the STAs may operate according to the adjusted parameters thereafter or until the AP advertises further adjusted parameters in a subsequent beacon (not shown for simplicity). In the example of FIG. 6, STA2 and STA4 enter the power-save mode at time $t_2$.

As a non-limiting example, the AP may determine that (iv) for a respective STA is greater than a value and that (i) for the respective STA is less than a value. In such implementations, the AP may reset a BSR trigger timer and transmit a Buffer Status Report Poll (BSRP) that triggers the respective STA to transmit a BSR to the AP. In the example of FIG. 6, the AP determines that (iv) for STA1 is greater than a value and that (i) for STA1 is less than a value. Thus, the AP transmits a BSRP (such as BSRP 610 at time $t_6$) to STA1 that triggers STA1 to transmit a BSR (such as BSR 612 at time $t_7$) to the AP.

As another non-limiting example, the AP may determine that (iv) for a respective STA is greater than a value and that (i) for the respective STA is greater than a value. In such implementations, when the AP receives a QoS NULL packet with a PM bit set to 0 from the respective STA, the AP may transmit a Buffer Status Report (BSR) trigger frame that triggers the respective STA to transmit buffer status information upon exiting the power-save mode. In the example of FIG. 6, the AP determines that (iv) for STA2 is greater than a value and that (i) for STA2 is greater than a value. Thus, when STA2 exits the power save-mode and transmits a QoS NULL packet with a PM bit set to 0 (such as QoS NULL packet 622 at time $t_{11}$) to the AP, the AP transmits a BSR trigger frame (such as BSR trigger frame 620 at time $t_{12}$) that triggers STA2 to transmit buffer status information (such as buffer information 624 at time $t_{13}$).

As another non-limiting example, the AP may determine that (iv) for a respective STA is less than a value and that (i) for the respective STA is greater than a value. In such implementations, the AP may thus include the respective STA in a scheduling candidate set for UL basic triggering and transmit a basic trigger frame that triggers the respective STA to transmit UL QoS information upon exiting the power-save mode. In the example of FIG. 6, the AP determines that (iv) for STA4 is less than a value and that (i) for STA4 is greater than a value. Thus, when STA4 exits the power save-mode and transmits a QoS NULL packet with a PM bit set to 0 (such as QoS NULL packet 642 at time $t_8$) to the AP, the AP transmits a basic trigger frame (such as basic trigger frame 640 at time $t_9$) that triggers STA4 to transmit UL QoS information (such as UL QoS information 644 at time $t_{10}$).

In some implementations, a respective STA may transmit an unsolicited BSR to the AP upon waking up from the power-save mode in response to a duration of the MU EDCA timer value exceeding a time period. In the example of FIG. 6, STA3 transmits an unsolicited BSR (such as BSR 632 at time $t_3$) to the AP based on the modified MU EDCA timer exceeding a value. In some implementations, BSR 632 is a QoS NULL packet including a buffer status for up to two of STA2's backlogged traffic identifiers (TIDs). That is, BSR 632 may indicate STA2's buffer status information for at least one Access Category (AC) unaffected by the MU EDCA timer value, such as AC_VI, AC_VO, or both. Thereafter, the AP transmits a trigger frame (such as trigger frame 630 at time $t_4$) to trigger STA2 to transmit its backlogged TIDs in one or more UL PPDUs (such as UL PPDU(s) 634 at time $t_5$) to the AP. The UL PPDUs may include, for example, STA3's backlogged AC_VI UL data, AC_VO UL data, or both. In some implementations, if one or more of the AC_VI UL data and the AC_VO UL data is insufficient to fill an entirety of one or more of the UL PPDUs, STA3 may insert data for at least one other AC that is affected by the MU EDCA timer value, such as AC_BE, AC_BK, or both. In this manner, STA3 may refrain from inserting wasteful padding in the one or more UL PPDUs.

In some implementations not shown, a respective STA may operate in one of multiple different power-save modes, such as a first power-save mode or a second power-save mode. In such implementations, the respective STA may increase a power-save timer in response to receiving trigger frames from the AP when the STA is operating in the first power-save mode. In addition, or in the alternative, the AP may refrain from transmitting one or more trigger frames to the respective STA when the respective STA is operating in the second power-save mode.

Figure 7:
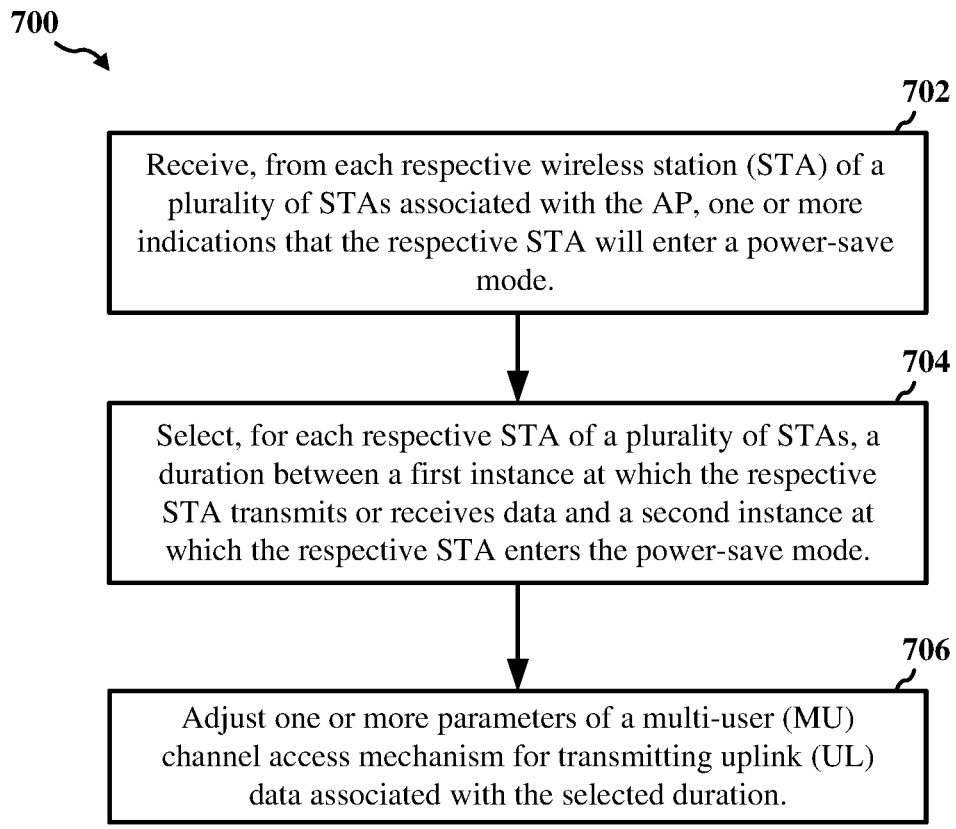
FIG. 7 shows a flowchart illustrating an example operation for wireless communication that supports multi-user channel access mechanisms.

FIG. 7 shows a flowchart illustrating an example operation 700 for wireless communication that supports multi-user channel access mechanisms. The operation 700 may be performed by a wireless communication device such as the wireless communication device 200 described with reference to FIG. 2. In some implementations, the operation 700 may be performed by a wireless communication device operating as or within an AP, such as one of the APs 102 and 302 described with reference to FIGS. 1 and 3B, respectively.

In block 702, the wireless communication device receives, from each respective wireless station (STA) of a plurality of STAs associated with the AP, one or more indications that the respective STA will enter a power-save mode.

In block 704, the wireless communication device selects, for each respective STA of a plurality of STAs, a duration between a first instance at which the respective STA transmits or receives data and a second instance at which the respective STA enters the power save mode.

In block 706, the wireless communication device adjusts one or more parameters of a multi-user (MU) channel access mechanism for transmitting uplink (UL) data associated with the selected duration.

In some implementations, at least one indication of the one or more indications is a power management (PM) bit carried in a medium access control (MAC) frame, and the PM bit is set to 1. In some instances, the MAC frame is a quality-of-service (QoS) NULL frame. In some other instances, the determined duration is an average duration between a plurality of first instances at which the respective STA transmits or receives data and a corresponding plurality of second instances at which the respective STA enters the power save mode. In some implementations, the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the respective STA.

Figure 8A:
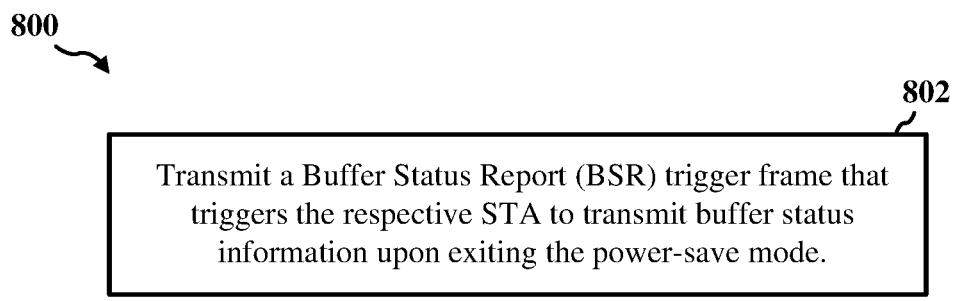
FIG. 8A shows a flowchart illustrating an example operation for wireless communication that supports multi-user channel access mechanisms.

FIG. 8A shows a flowchart illustrating an example operation 800 for wireless communication that supports multi-user channel access mechanisms. The operation 800 may be performed by a wireless communication device such as the wireless communication device 200 described with reference to FIG. 2. In some implementations, the operation 800 may be performed by a wireless communication device operating as or within an AP, such as one of the APs 102 and 302 described with reference to FIGS. 1 and 3B, respectively. For example, the operation 800 may be performed after receiving the one or more indications in block 702 of the operation 700.

In block 802, the wireless communication device transmits a Buffer Status Report (BSR) trigger frame that triggers the respective STA to transmit buffer status information upon exiting the power save mode. In some implementations, at least one indication of the one or more indications is a PM bit carried in a medium access control (MAC) frame. In some instances, the PM bit is set to 0.

Figure 8B:
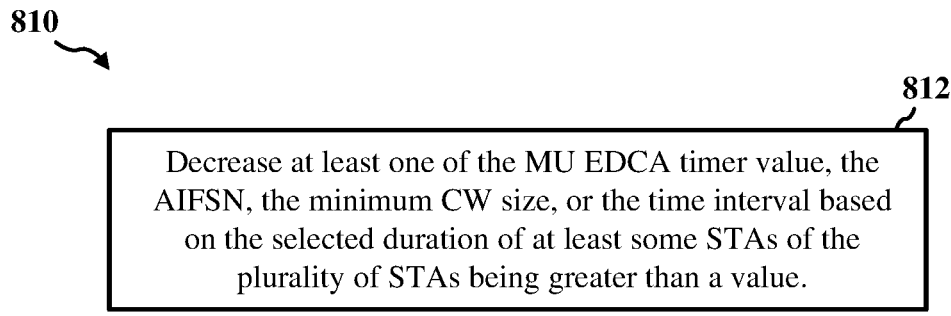
FIG. 8B shows a flowchart illustrating an example operation for wireless communication that supports multi-user channel access mechanisms.

FIG. 8B shows a flowchart illustrating an example operation 810 for wireless communication that supports multi-user channel access mechanisms. The operation 810 may be performed by a wireless communication device such as the wireless communication device 200 described with reference to FIG. 2. In some implementations, the operation 810 may be performed by a wireless communication device operating as or within an AP, such as one of the APs 102 and 302 described with reference to FIGS. 1 and 3B, respectively. For example, the operation 810 may be one implementation of adjusting the one or more parameters in block 706 of the operation 700.

In block 812, the wireless communication device decreases at least one of the MU EDCA timer value, the AIFSN, the minimum CW size, or the time interval based on the determined duration of at least some STAs of the plurality of STAs being greater than a value.

Figure 8C:
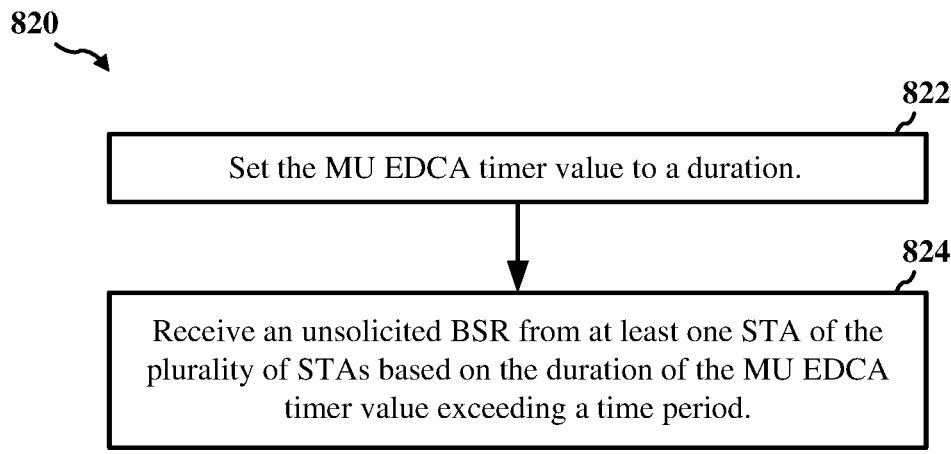
FIG. 8C shows a flowchart illustrating an example operation for wireless communication that supports multi-user channel access mechanisms.

FIG. 8C shows a flowchart illustrating an example operation 820 for wireless communication that supports multi-user channel access mechanisms. The operation 820 may be performed by a wireless communication device such as the wireless communication device 200 described with reference to FIG. 2. In some implementations, the operation 820 may be performed by a wireless communication device operating as or within an AP, such as one of the APs 102 and 302 described with reference to FIGS. 1 and 3B, respectively. For example, the operation 820 may be performed during or after adjusting the one or more parameters in block 706 of the operation 700.

In block 822, the wireless communication device sets the MU EDCA timer value to a duration.

In block 824, the wireless communication device receives an unsolicited BSR from at least one STA of the plurality of STAs based on the duration of the MU EDCA timer value exceeding a time period.

Figure 8D:
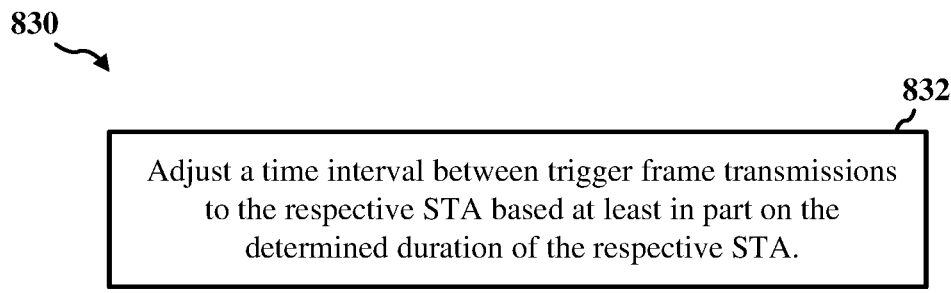
FIG. 8D shows a flowchart illustrating an example operation for wireless communication that supports multi-user channel access mechanisms.

FIG. 8D shows a flowchart illustrating an example operation 830 for wireless communication that supports multi-user channel access mechanisms. The operation 830 may be performed by a wireless communication device such as the wireless communication device 200 described with reference to FIG. 2. In some implementations, the operation 830 may be performed by a wireless communication device operating as or within an AP, such as one of the APs 102 and 302 described with reference to FIGS. 1 and 3B, respectively. For example, the operation 830 may be one implementation of adjusting the one or more parameters in block 706 of the operation 700.

In block 832, the wireless communication device adjusts a time interval between trigger frame transmissions to the respective STA based at least in part on the determined duration of the respective STA.

Figure 8E:
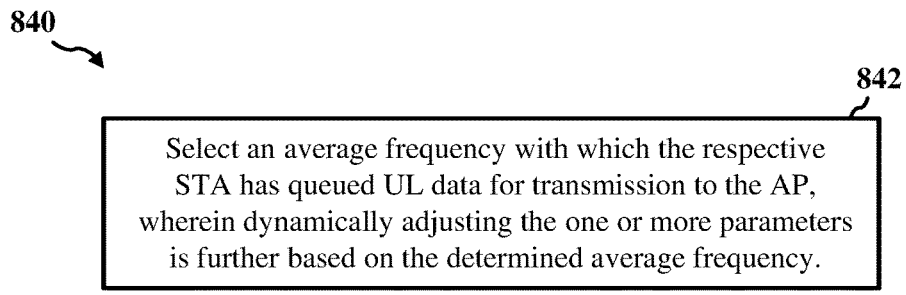
FIG. 8E shows a flowchart illustrating an example operation for wireless communication that supports multi-user channel access mechanisms.

FIG. 8E shows a flowchart illustrating an example operation 840 for wireless communication that supports multi-user channel access mechanisms. The operation 840 may be performed by a wireless communication device such as the wireless communication device 200 described with reference to FIG. 2. In some implementations, the operation 840 may be performed by a wireless communication device operating as or within an AP, such as one of the APs 102 and 302 described with reference to FIGS. 1 and 3B, respectively. For example, the operation 840 may be performed after selecting the duration in block 704 of the operation 700.

In block 842, the wireless communication device selects an average frequency with which the respective STA has queued UL data for transmission to the AP, where dynamically adjusting the one or more parameters is further based on the determined average frequency.

Figure 8F:
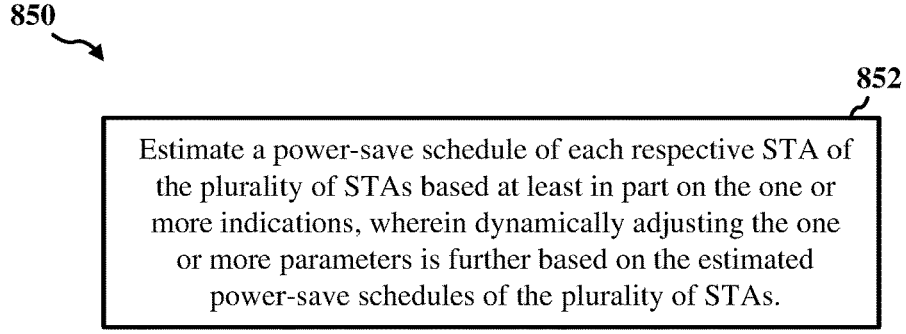
FIG. 8F shows a flowchart illustrating an example operation for wireless communication that supports multi-user channel access mechanisms.

FIG. 8F shows a flowchart illustrating an example operation 850 for wireless communication that supports multi-user channel access mechanisms. The operation 850 may be performed by a wireless communication device such as the wireless communication device 200 described with reference to FIG. 2. In some implementations, the operation 850 may be performed by a wireless communication device operating as or within an AP, such as one of the APs 102 and 302 described with reference to FIGS. 1 and 3B, respectively. For example, the operation 850 may be one implementation of adjusting the one or more parameters in block 706 of the operation 700.

In block 852, the wireless communication device estimates a power save schedule of each respective STA of the plurality of STAs based at least in part on the one or more indications, where dynamically adjusting the one or more parameters is further based on the estimated power save schedules of the plurality of STAs. In some instances, the estimated power save schedule of the respective STA is indicative of a likelihood that the respective STA has queued UL data.

Figure 8G:
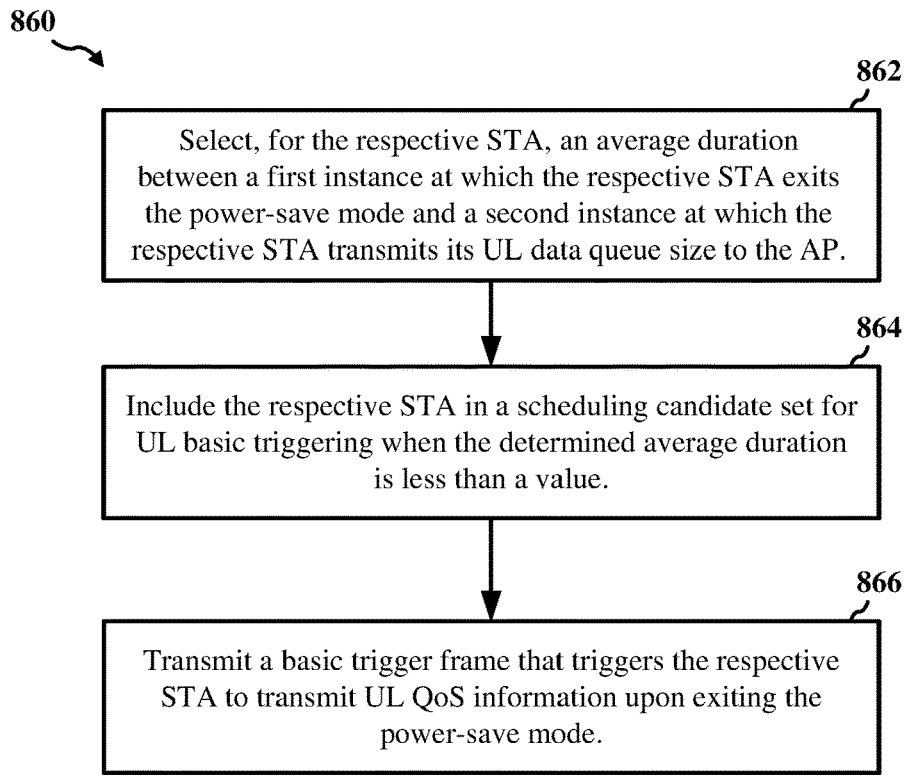
FIG. 8G shows a flowchart illustrating an example operation for wireless communication that supports multi-user channel access mechanisms.

FIG. 8G shows a flowchart illustrating an example operation 860 for wireless communication that supports multi-user channel access mechanisms. The operation 860 may be performed by a wireless communication device such as the wireless communication device 200 described with reference to FIG. 2. In some implementations, the operation 860 may be performed by a wireless communication device operating as or within an AP, such as one of the APs 102 and 302 described with reference to FIGS. 1 and 3B, respectively. For example, the operation 860 may be performed after estimating the power save schedule in block 852 of the operation 850. In some implementations, the estimated power save schedule of the respective STA may be indicative of whether the respective STA transmits its UL data queue size to the AP when exiting the power-save mode.

In block 862, the wireless communication device selects, for the respective STA, an average duration between a first instance at which the respective STA exits the power-save mode and a second instance at which the respective STA transmits its UL data queue size to the AP.

In block 864, the wireless communication device includes the respective STA in a scheduling candidate set for UL basic triggering when the determined average duration is less than a value.

In block 866, the wireless communication device transmits a basic trigger frame that triggers the respective STA to transmit UL QoS information upon exiting the power-save mode.

Figure 8H:
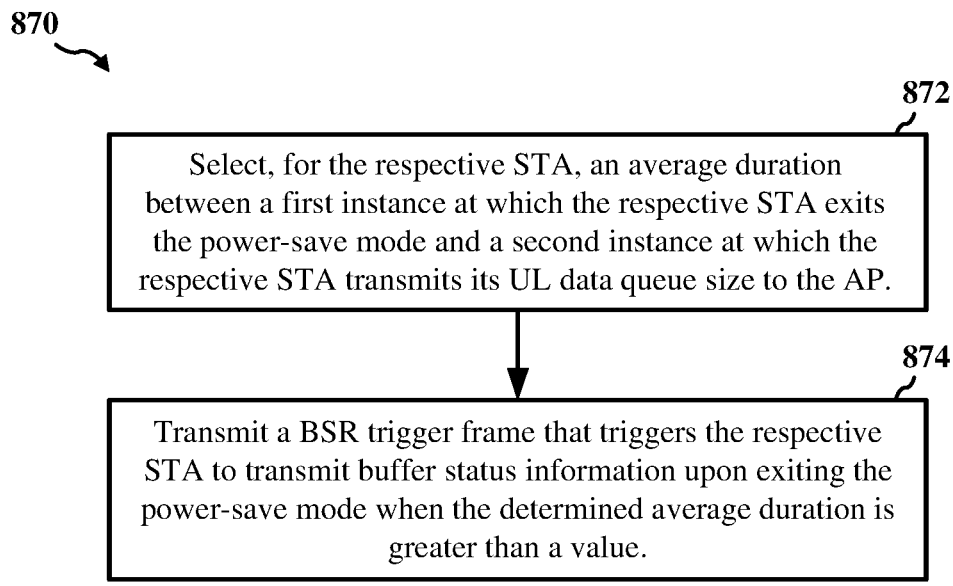
FIG. 8H shows a flowchart illustrating an example operation for wireless communication that supports multi-user channel access mechanisms.

FIG. 8H shows a flowchart illustrating an example operation 870 for wireless communication that supports multi-user channel access mechanisms. The operation 870 may be performed by a wireless communication device such as the wireless communication device 200 described with reference to FIG. 2. In some implementations, the operation 870 may be performed by a wireless communication device operating as or within an AP, such as one of the APs 102 and 302 described with reference to FIGS. 1 and 3B, respectively. For example, the operation 870 may be performed after estimating the power-save schedule in block 852 of the operation 850. In some implementations, the estimated power-save schedule of the respective STA may be indicative of whether the respective STA transmits its UL data queue size to the AP when exiting the power-save mode.

In block 872, the wireless communication device selects, for the respective STA, an average duration between a first instance at which the respective STA exits the power-save mode and a second instance at which the respective STA transmits its UL data queue size to the AP.

In block 874, the wireless communication device transmits a BSR trigger frame that triggers the respective STA to transmit buffer status information upon exiting the power-save mode when the determined average duration is greater than a value.

Figure 8I:
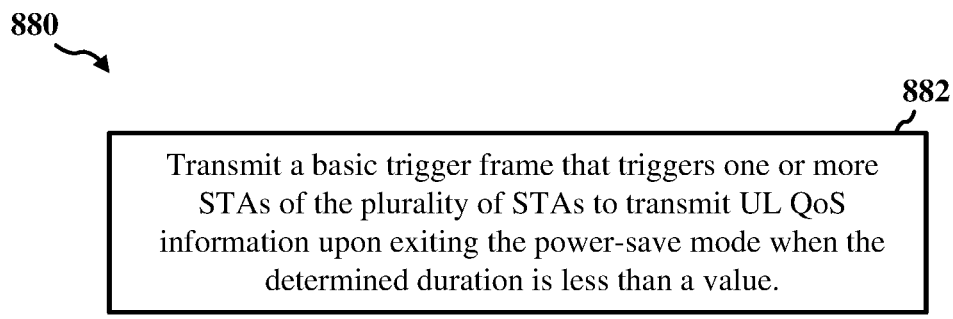
FIG. 8I shows a flowchart illustrating an example operation for wireless communication that supports multi-user channel access mechanisms.

FIG. 8I shows a flowchart illustrating an example operation 880 for wireless communication that supports multi-user channel access mechanisms. The operation 880 may be performed by a wireless communication device such as the wireless communication device 200 described with reference to FIG. 2. In some implementations, the operation 880 may be performed by a wireless communication device operating as or within an AP, such as one of the APs 102 and 302 described with reference to FIGS. 1 and 3B, respectively. For example, the operation 880 may be performed after adjusting the one or more parameters in block 706 of the operation 700.

In block 882, the wireless communication device transmits a basic trigger frame that triggers one or more STAs of the plurality of STAs to transmit UL QoS information upon exiting the power-save mode when the determined duration is less than a value.

Figure 8J:
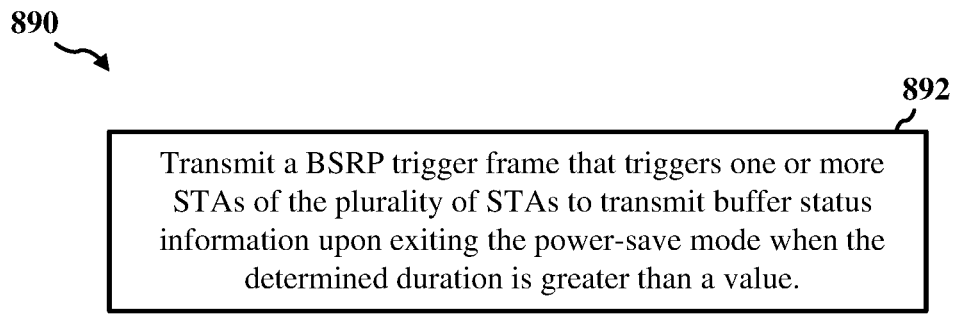
FIG. 8J shows a flowchart illustrating an example operation for wireless communication that supports multi-user channel access mechanisms.

FIG. 8J shows a flowchart illustrating an example operation 890 for wireless communication that supports multi-user channel access mechanisms. The operation 890 may be performed by a wireless communication device such as the wireless communication device 200 described with reference to FIG. 2. In some implementations, the operation 890 may be performed by a wireless communication device operating as or within an AP, such as one of the APs 102 and 302 described with reference to FIGS. 1 and 3B, respectively. For example, the operation 890 may be performed after adjusting the one or more parameters in block 706 of the operation 700.

In block 892, the wireless communication device transmits a BSRP trigger frame that triggers one or more STAs of the plurality of STAs to transmit buffer status information upon exiting the power-save mode when the determined duration is greater than a value.

Figure 9:
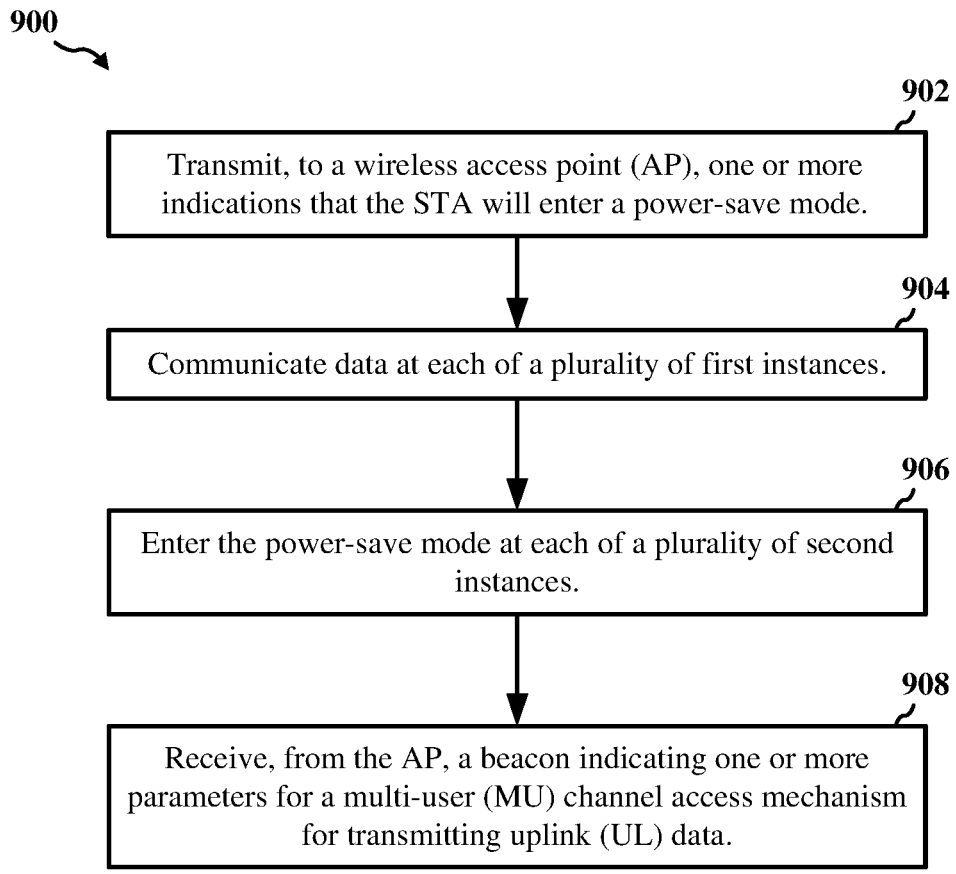
FIG. 9 shows a flowchart illustrating an example operation for wireless communication that supports multi-user channel access mechanisms.

FIG. 9 shows a flowchart illustrating an example operation 900 for wireless communication that supports multi-user channel access mechanisms. The operation 900 may be performed by a wireless communication device such as the wireless communication device 200 described with reference to FIG. 2. In some implementations, the operation 900 may be performed by a wireless communication device operating as or within a STA, such as one of the STAs 104 and 304 described with reference to FIGS. 1 and 3B, respectively.

In block 902, the wireless communication device transmits, to a wireless access point (AP), one or more indications that the STA will enter a power-save mode.

In block 904, the wireless communication device communicates data at each of a plurality of first instances.

In block 906, the wireless communication device enters the power-save mode at each of a plurality of second instances.

In block 908, the wireless communication device receives, from the AP, a beacon indicating one or more parameters for a multi-user (MU) channel access mechanism for transmitting uplink (UL) data.

In some implementations, the duration indicates an average duration between respective pairs of the first and second instances. In some instances, at least one indication of the one or more indications is a power management (PM) bit carried in a medium access control (MAC) frame, and the PM bit is set to 1. In some other instances, the MAC frame is a quality-of-service (QoS) NULL frame. In some implementations, the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the STA. In some instances, at least one of the MU EDCA timer value, the AIFSN, the minimum CW size, or the time interval is set based on at least one of a duration between respective pairs of the first and second instances being greater than a value, a likelihood that the STA has queued UL data, or an average frequency at which the STA has queued UL data for transmission to the AP.

Figure 10A:
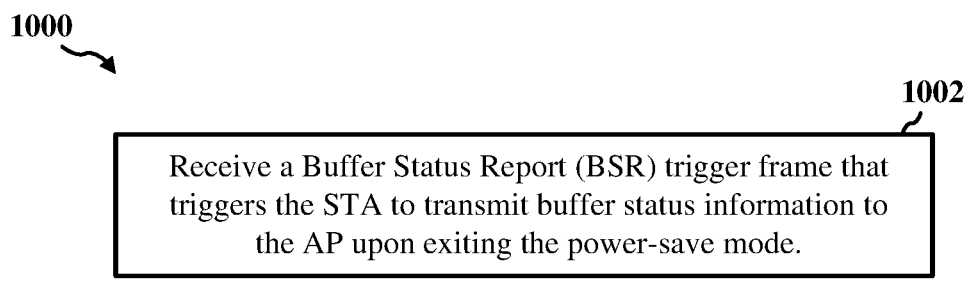
FIG. 10A shows a flowchart illustrating an example operation for wireless communication that supports multi-user channel access mechanisms.

FIG. 10A shows a flowchart illustrating an example operation 1000 for wireless communication that supports multi-user channel access mechanisms. The operation 1000 may be performed by a wireless communication device such as the wireless communication device 200 described with reference to FIG. 2. In some implementations, the operation 1000 may be performed by a wireless communication device operating as or within a STA, such as one of the STAs 104 and 304 described with reference to FIGS. 1 and 3B, respectively. For example, the operation 1000 may be performed after entering the power-save mode in block 906 of the operation 900. In some implementations, at least one indication of the one or more indications is a PM bit carried in a medium access control (MAC) frame, and the PM bit is set to 0.

In block 1002, the wireless communication device receives a Buffer Status Report (BSR) trigger frame that triggers the STA to transmit buffer status information to the AP upon exiting the power-save mode.

Figure 10B:
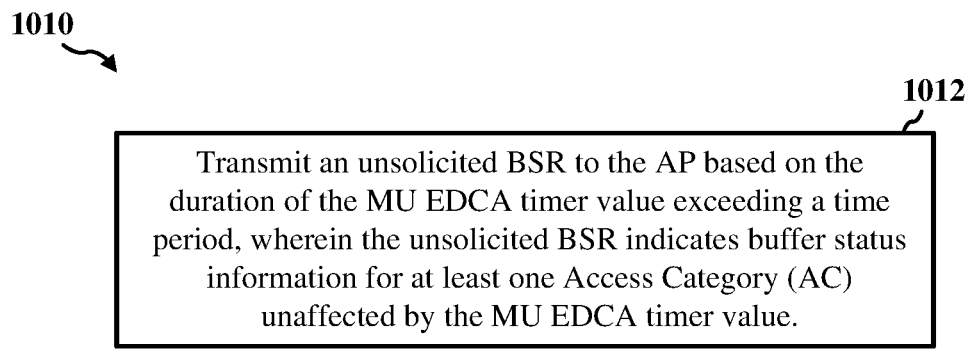
FIG. 10B shows a flowchart illustrating an example operation for wireless communication that supports multi-user channel access mechanisms.

FIG. 10B shows a flowchart illustrating an example operation 1010 for wireless communication that supports multi-user channel access mechanisms. The operation 1010 may be performed by a wireless communication device such as the wireless communication device 200 described with reference to FIG. 2. In some implementations, the operation 1010 may be performed by a wireless communication device operating as or within a STA, such as one of the STAs 104 and 304 described with reference to FIGS. 1 and 3B, respectively. For example, the operation 1010 may be performed after receiving the beacon in block 908 of the operation 900. In some implementations, at least one parameter of the one or more parameters indicates a duration of the MU EDCA timer value.

In block 1012, the wireless communication device transmits an unsolicited BSR to the AP based on the duration of the MU EDCA timer value exceeding a time period, where the unsolicited BSR indicates buffer status information for at least one Access Category (AC) unaffected by the MU EDCA timer value.

Figure 10C:
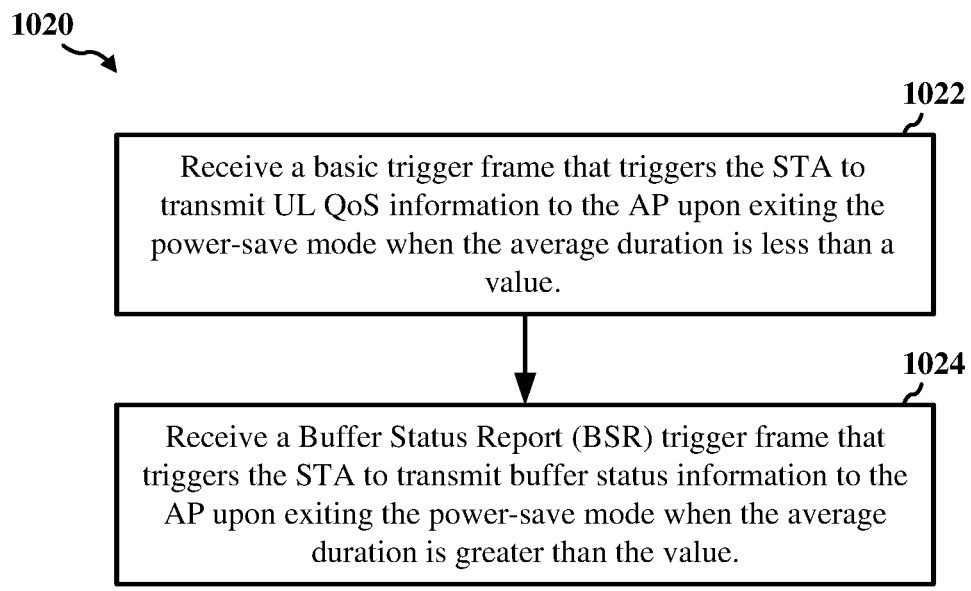
FIG. 10C shows a flowchart illustrating an example operation for wireless communication that supports multi-user channel access mechanisms.

FIG. 10C shows a flowchart illustrating an example operation 1020 for wireless communication that supports multi-user channel access mechanisms. The operation 1020 may be performed by a wireless communication device such as the wireless communication device 200 described with reference to FIG. 2. In some implementations, the operation 1020 may be performed by a wireless communication device operating as or within a STA, such as one of the STAs 104 and 304 described with reference to FIGS. 1 and 3B, respectively. For example, the operation 1020 may be performed after entering the power-save mode in block 906 of the operation 900. In some implementations, at least one of the MU EDCA timer value, the AIFSN, the minimum CW size, or the time interval is set based on an average duration between a first instance at which the STA exits the power-save mode and a second instance at which the STA transmits its UL data queue size to the AP.

In block 1022, the wireless communication device receives a basic trigger frame that triggers the STA to transmit UL QoS information to the AP upon exiting the power-save mode when the average duration is less than a value.

In block 1024, the wireless communication device receives a BSRP trigger frame that triggers the STA to transmit buffer status information to the AP upon exiting the power-save mode when the average duration is greater than the value.

Figure 10D:
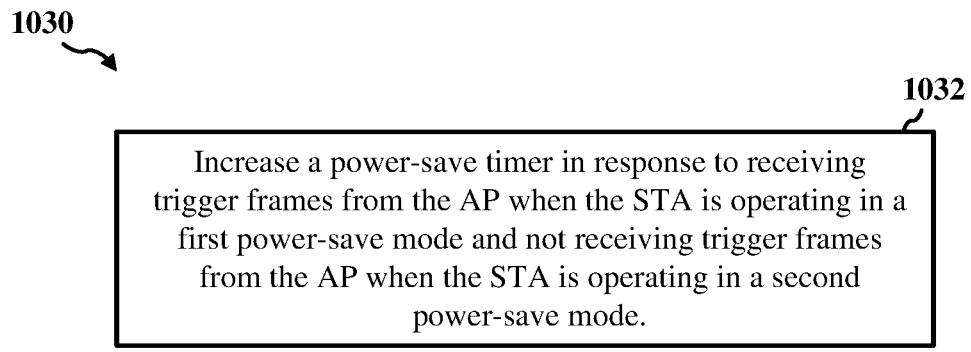
FIG. 10D shows a flowchart illustrating an example operation for wireless communication that supports multi-user channel access mechanisms.

FIG. 10D shows a flowchart illustrating an example operation 1030 for wireless communication that supports multi-user channel access mechanisms. The operation 1030 may be performed by a wireless communication device such as the wireless communication device 200 described with reference to FIG. 2. In some implementations, the operation 1030 may be performed by a wireless communication device operating as or within a STA, such as one of the STAs 104 and 304 described with reference to FIGS. 1 and 3B, respectively. For example, the operation 1030 may be performed after entering the power-save mode in block 906 of the operation 900.

In block 1032, the wireless communication device increases a power-save timer in response to receiving trigger frames from the AP when the STA is operating in a first power-save mode and not receiving trigger frames from the AP when the STA is operating in a second power-save mode.

Implementation examples are described in the following numbered clauses:

1. A method for wireless communication by an apparatus of a wireless access point (AP), including:
    receiving, from each respective wireless station (STA) of a plurality of STAs associated with the AP, one or more indications that the respective STA will enter a power-save mode;
    selecting, for each respective STA of the plurality of STAs, a duration between a first instance at which the respective STA transmits or receives data and a second instance at which the respective STA enters the power-save mode; and
    adjusting one or more parameters of a multi-user (MU) channel access mechanism for transmitting uplink (UL) data associated with the selected duration.
2. The method of clause 1, where the duration is an average duration between a plurality of first instances at which the respective STA transmits or receives data and a corresponding plurality of second instances at which the respective STA enters the power-save mode.
3. The method of any one or more of clauses 1-2, where at least one indication of the one or more indications includes a power management (PM) bit carried in a medium access control (MAC) frame, where the PM bit is set to 1.
4. The method of clause 3, where the MAC frame is a quality-of-service (QoS) NULL frame.
5. The method of any one or more of clauses 1-2, where at least one indication of the one or more indications includes a PM bit carried in a medium access control (MAC) frame, where the PM bit is set to 0, the method further including:
    transmitting a Buffer Status Report (BSR) trigger frame that triggers the respective STA to transmit buffer status information upon exiting the power-save mode.
6. The method of any one or more of clauses 1-5, where the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the respective STA.
7. The method of any one or more of clauses 1-6, where dynamically adjusting the one or more parameters includes:
    decreasing at least one of the MU EDCA timer value, the AIFSN, the minimum CW size, or the time interval based on the selected duration of at least some STAs of the plurality of STAs being greater than a value.
8. The method of clause 7, further including:
    setting the MU EDCA timer value to a duration; and
    receiving an unsolicited BSR from at least one STA of the plurality of STAs based on the duration of the MU EDCA timer value exceeding a time period.
9. The method of any one or more of clauses 1-8, further including:
    adjusting a time interval between trigger frame transmissions to the respective STA based at least in part on the determined duration of the respective STA.
10. The method of any one or more of clauses 1-9, further including:
    selecting an average frequency with which the respective STA has queued UL data for transmission to the AP, where dynamically adjusting the one or more parameters is further based on the determined average frequency.
11. The method of any one or more of clauses 1-10, further including:
    estimating a power-save schedule of each respective STA of the plurality of STAs based at least in part on the one or more indications, where dynamically adjusting the one or more parameters is further based on the estimated power-save schedules of the plurality of STAs.
12. The method of clause 11, where the estimated power-save schedule of the respective STA is indicative of whether the respective STA transmits its UL data queue size to the AP when exiting the power-save mode, the method further including:
    selecting, for the respective STA, an average duration between a first instance at which the respective STA exits the power-save mode and a second instance at which the respective STA transmits its UL data queue size to the AP;
    including the respective STA in a scheduling candidate set for UL basic triggering when the determined average duration is less than a value; and
    transmitting a basic trigger frame that triggers the respective STA to transmit UL QoS information upon exiting the power-save mode.
13. The method of clause 11, where the estimated power-save schedule of the respective STA is indicative of whether the respective STA transmits its UL data queue size to the AP when exiting the power-save mode, the method further including:

selecting, for the respective STA, an average duration between a first instance at which the respective STA exits the power-save mode and a second instance at which the respective STA transmits its UL data queue size to the AP; and transmitting a BSR trigger frame that triggers the respective STA to transmit buffer status information upon exiting the power-save mode when the determined average duration is greater than a value.

14. The method of clause 11, where the estimated power-save schedule of the respective STA is indicative of a likelihood that the respective STA has queued UL data.

15. The method of clause 1, further including:

transmitting a basic trigger frame that triggers one or more STAs of the plurality of STAs to transmit UL QoS information upon exiting the power-save mode when the determined duration is less than a value.

16. The method of clause 1, further including:

transmitting a Buffer Status Report (BSR) trigger frame that triggers one or more STAs of the plurality of STAs to transmit buffer status information upon exiting the power-save mode when the determined duration is greater than a value.

17. A wireless communication device including means for performing the operations of any one or more of clauses 1-16.

18. A non-transitory computer-readable memory including instructions that, when executed by one or more processors of a wireless communication device, cause the wireless communication device to perform the operations of any one or more of clauses 1-16.

19. A wireless communication device including:

an interface configured to:
  obtain one or more indications that a wireless station (STA) will enter a power-save mode; and
a processing system configured to:
  select, for each respective STA of a plurality of STAs, a duration between a first instance at which the respective STA transmits or receives data and a second instance at which the respective STA enters the power-save mode; and
  adjust one or more parameters of a multi-user (MU) channel access mechanism for transmitting uplink (UL) data associated with the selected duration.

20. The wireless communication device of clause 19, where at least one indication of the one or more indications includes a power management (PM) bit carried in a medium access control (MAC) frame, where the PM bit is set to 1.

21. The wireless communication device of clause 20, where the MAC frame is a quality-of-service (QoS) NULL frame.

22. The wireless communication device of clause 19, where at least one indication of the one or more indications includes a PM bit carried in a medium access control (MAC) frame, where the PM bit is set to 0, and where the interface is further configured to:

output a Buffer Status Report (BSR) trigger frame that triggers the respective STA to transmit buffer status information upon exiting the power-save mode.

23. The wireless communication device of any one or more of clauses 19-22, where the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the respective STA.

24. The wireless communication device of any one or more of clauses 19-23, where dynamically adjusting the one or more parameters includes:

decreasing at least one of the MU EDCA timer value, the AIFSN, the minimum CW size, or the time interval based on the selected duration of at least some STAs of the plurality of STAs being greater than a value.

25. The wireless communication device of any one or more of clauses 19-24, where the processing system is further configured to:

estimate a power-save schedule of each respective STA of the plurality of STAs based at least in part on the one or more indications, where dynamically adjusting the one or more parameters is further based on the estimated power-save schedules of the plurality of STAs.

26. A method for wireless communication performed by an apparatus of a wireless station (STA), including:

transmitting, to a wireless access point (AP), one or more indications that the STA will enter a power-save mode;

communicating data at each of a plurality of first instances;

entering the power-save mode at each of a plurality of second instances; and receiving, from the AP, a beacon indicating one or more parameters for a multi-user (MU) channel access mechanism for transmitting uplink (UL) data.

27. The method of clause 26, where at least one parameter of the one or more parameters is configured based on a duration between respective pairs of the first and second instances, and where the duration indicates an average duration between respective pairs of the first and second instances.

28. The method of any one or more of clauses 26-27, where at least one indication of the one or more indications includes a power management (PM) bit carried in a medium access control (MAC) frame, where the PM bit is set to 1.

29. The method of clause 28, where the MAC frame is a quality-of-service (QoS) NULL frame.

30. The method of clause 26, where at least one indication of the one or more indications includes a PM bit carried in a medium access control (MAC) frame, where the PM bit is set to 0, the method further including:

receiving a Buffer Status Report (BSR) trigger frame that triggers the STA to transmit buffer status information to the AP upon exiting the power-save mode.

31. The method of any one or more of clauses 26-30, where the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the STA.

32. The method of clause 31, where at least one of the MU EDCA timer value, the AIFSN, the minimum CW size, or the time interval is set based on at least one of a duration between respective pairs of the first and second instances being greater than a value, a likelihood that the STA has queued UL data, or an average frequency with which the STA has queued UL data for transmission to the AP.

33. The method of any one or more of clauses 31-32, where at least one parameter of the one or more parameters indicates a duration of the MU EDCA timer value, the method further including:

transmitting an unsolicited BSR to the AP based on the duration of the MU EDCA timer value exceeding a time period, where the unsolicited BSR indicates buffer status information for at least one Access Category (AC) unaffected by the MU EDCA timer value.

34. The method of any one or more of clauses 31-32, where at least one of the MU EDCA timer value, the AIFSN, the minimum CW size, or the time interval is set based on an average duration between a first instance at which the STA exits the power-save mode and a second instance at which the STA transmits its UL data queue size to the AP, the method further including:

receiving a basic trigger frame that triggers the STA to transmit UL QoS information to the AP upon exiting the power-save mode when the average duration is less than a value; and receiving a Buffer Status Report (BSR) trigger frame that triggers the STA to transmit buffer status information to the AP upon exiting the power-save mode when the average duration is greater than the value.

35. The method of clause 26, further including:

increasing a power-save timer in response to receiving trigger frames from the AP when the STA is operating in a first power-save mode and not receiving trigger frames from the AP when the STA is operating in a second power-save mode.

36. The method of clause 26, further including:

increasing a power-save timer in response to receiving trigger frames from the AP when the STA is operating in a first power-save mode and not receiving trigger frames from the AP when the STA is operating in a second power-save mode.

37. A wireless communication device including means for performing the operations of any one or more of clauses 26-36.

38. A non-transitory computer-readable memory including instructions that, when executed by one or more processors of a wireless communication device, cause the wireless communication device to perform the operations of any one or more of clauses 26-36.

39. A wireless communication device including:

an interface configured to:
  output one or more indications that the wireless communication device will enter a power-save mode; and
  output or obtain data at each of a plurality of first instances;

a processing system configured to:
  enter the power-save mode at each of a plurality of second instances; and the interface further configured to:
  obtain, from the AP, a beacon indicating one or more parameters to be used for a multi-user (MU) channel access mechanism for transmitting uplink (UL) data.

40. The wireless communication device of clause 39, where at least one indication of the one or more indications includes a power management (PM) bit carried in a medium access control (MAC) frame, where the PM bit is set to 1.

41. The wireless communication device of clause 40, where the MAC frame is a quality-of-service (QoS) NULL frame.

42. The wireless communication device of clause 39, where at least one indication of the one or more indications includes a PM bit carried in a medium access control (MAC) frame, where the PM bit is set to 0, and where the interface is further configured to:
  obtain a Buffer Status Report (BSR) trigger frame that triggers the wireless communication device to transmit buffer status information to the AP upon exiting the power-save mode.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A method for wireless communication performed by an apparatus of a wireless access point (AP), comprising:
receiving, from each respective wireless station (STA) of a plurality of STAs associated with the AP, one or more indications that the respective STA will enter a power-save mode; and
adjusting, for each respective STA of the plurality of STAs, one or more parameters of a multi-user (MU) channel access mechanism for transmitting uplink (UL) data based on a duration between a first instance at which the respective STA transmits or receives data and a second instance at which the respective STA enters the power-save mode and based on a quantity of the plurality of STAs having the duration greater than a value.

2. The method of claim 1, wherein at least one indication of the one or more indications comprises a power management (PM) bit carried in a medium access control (MAC) frame, wherein the PM bit is set to 1.

3. The method of claim 2, wherein the MAC frame is a quality-of-service (QoS) NULL frame.

4. The method of claim 1, wherein at least one indication of the one or more indications comprises a PM bit carried in a medium access control (MAC) frame, wherein the PM bit is set to 0, the method further comprising:
transmitting a Buffer Status Report (BSR) trigger frame that triggers the respective STA to transmit buffer status information upon exiting the power-save mode.

5. The method of claim 1, wherein the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the respective STA.

6. The method of claim 5, wherein adjusting the one or more parameters comprises:
decreasing at least one of the MU EDCA timer value, the AIFSN, the minimum CW size, or the time interval.

7. The method of claim 1, further comprising:
selecting an average frequency with which the respective STA has queued UL data for transmission to the AP, wherein adjusting the one or more parameters is further based on the selected average frequency.

8. The method of claim 1, further comprising:
estimating a power-save schedule of each respective STA of the plurality of STAs based at least in part on the one or more indications, wherein adjusting the one or more parameters is further based on the estimated power-save schedules of the plurality of STAs.

9. The method of claim 8, wherein the estimated power-save schedule of the respective STA is indicative of whether the respective STA transmits its UL data queue size to the AP when exiting the power-save mode, the method further comprising:
selecting, for the respective STA, an average duration between a first instance at which the respective STA exits the power-save mode and a second instance at which the respective STA transmits its UL data queue size to the AP;
including the respective STA in a scheduling candidate set for UL basic triggering when the selected average duration is less than a value; and
transmitting a basic trigger frame that triggers the respective STA to transmit UL QoS information upon exiting the power-save mode.

10. The method of claim 8, wherein the estimated power-save schedule of the respective STA is indicative of whether the respective STA transmits its UL data queue size to the AP when exiting the power-save mode, the method further comprising:
selecting, for the respective STA, an average duration between a first instance at which the respective STA exits the power-save mode and a second instance at which the respective STA transmits its UL data queue size to the AP; and
transmitting a BSR trigger frame that triggers the respective STA to transmit buffer status information upon exiting the power-save mode when the selected average duration is greater than a value.

11. The method of claim 1, wherein adjusting the one or more parameters includes adjusting the one or more parameters based on the quantity, of the plurality of STAs having the duration greater than the value, satisfying a threshold quantity.

12. The method of claim 11, wherein the quantity is a percentage of the plurality of STAs having the duration greater than the value.

13. A wireless communication device comprising:
an interface configured to:
obtain one or more indications that a wireless station (STA) will enter a power-save mode; and
a processing system configured to:
select, for each respective STA of a plurality of STAs, a duration between a first instance at which the respective STA transmits or receives data and a second instance at which the respective STA enters the power-save mode; and
adjust, for each respective STA of the plurality of STAs, one or more parameters of a multi-user (MU) channel access mechanism for transmitting uplink (UL) data based on the duration between the first instance at which the respective STA transmits or receives data and the second instance at which the respective STA enters the power-save mode and based on a quantity of the plurality of STAs having the duration greater than a value.

14. The wireless communication device of claim 13, wherein at least one indication of the one or more indications comprises a power management (PM) bit carried in a medium access control (MAC) frame, wherein the PM bit is set to 1.

15. The wireless communication device of claim 14, wherein the MAC frame is a quality-of-service (QoS) NULL frame.

16. The wireless communication device of claim 13, wherein at least one indication of the one or more indications comprises a PM bit carried in a medium access control (MAC) frame, wherein the PM bit is set to 0, and wherein the interface is further configured to:
output a Buffer Status Report (BSR) trigger frame that triggers the respective STA to transmit buffer status information upon exiting the power-save mode.

17. The wireless communication device of claim 13, wherein the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the respective STA.

18. The wireless communication device of claim 17, wherein adjusting the one or more parameters comprises: decreasing at least one of the MU EDCA timer value, the AIFSN, the minimum CW size, or the time interval.

19. The wireless communication device of claim 13, wherein the processing system is further configured to: estimate a power-save schedule of each respective STA of the plurality of STAs based at least in part on the one or more indications, wherein adjusting the one or more parameters is further based on the estimated power-save schedules of the plurality of STAs.

20. A method for wireless communication performed by an apparatus of a wireless station (STA), comprising:
transmitting, to a wireless access point (AP), one or more indications that the STA will enter a power-save mode;
communicating data at each of a plurality of first instances;
entering the power-save mode at each of a plurality of second instances; and
receiving, from the AP, a beacon indicating one or more parameters for a multi-user (MU) channel access mechanism for transmitting uplink (UL) data, the one or more parameters based on a duration between a first instance at which a respective STA of a plurality of STAs transmits or receives data and a second instance at which the respective STA enters a power-save mode and based on a quantity of the plurality of STAs having the duration greater than a value.

21. The method of claim 20, wherein at least one indication of the one or more indications comprises a power management (PM) bit carried in a medium access control (MAC) frame, wherein the PM bit is set to 1.

22. The method of claim 21, wherein the MAC frame is a quality-of-service (QoS) NULL frame.

23. The method of claim 20, wherein at least one indication of the one or more indications comprises a PM bit carried in a medium access control (MAC) frame, wherein the PM bit is set to 0, the method further comprising:
receiving a Buffer Status Report (BSR) trigger frame that triggers the STA to transmit buffer status information to the AP upon exiting the power-save mode.

24. The method of claim 20, wherein the one or more parameters includes at least one of a MU Enhanced Distributed Channel Access (EDCA) timer value, an arbitration inter-frame spacing number (AIFSN), a minimum contention window (CW) size, a maximum CW size, or a time interval between trigger frame transmissions to the STA.

25. The method of claim 24, wherein at least one of the MU EDCA timer value, the AIFSN, the minimum CW size, or the time interval is set based on a likelihood that the STA has queued UL data, or an average frequency with which the STA has queued UL data for transmission to the AP.

26. The method of claim 24, wherein at least one parameter of the one or more parameters indicates a duration of the MU EDCA timer value, the method further comprising:
transmitting an unsolicited BSR to the AP based on the duration of the MU EDCA timer value exceeding a time period, wherein the unsolicited BSR indicates buffer status information for at least one Access Category (AC) unaffected by the MU EDCA timer value.

27. The method of claim 24, wherein at least one of the MU EDCA timer value, the AIFSN, the minimum CW size, or the time interval is set based on an average duration between a first instance at which the STA exits the power-save mode and a second instance at which the STA transmits its UL data queue size to the AP, the method further comprising:
receiving a basic trigger frame that triggers the STA to transmit UL QoS information to the AP upon exiting the power-save mode when the average duration is less than a value; and
receiving a Buffer Status Report (BSR) trigger frame that triggers the STA to transmit buffer status information to the AP upon exiting the power-save mode when the average duration is greater than the value.

28. The method of claim 20, further comprising:
increasing a power-save timer in response to receiving trigger frames from the AP when the STA is operating in a first power-save mode and not receiving trigger frames from the AP when the STA is operating in a second power-save mode.

29. A wireless communication device comprising:
an interface configured to:
output one or more indications that the wireless communication device will enter a power-save mode; and
output or obtain data at each of a plurality of first instances;
a processing system configured to:
enter the power-save mode at each of a plurality of second instances; and the interface further configured to:
obtain a beacon indicating one or more parameters to be used for a multi-user (MU) channel access mechanism for transmitting uplink (UL) data, the one or more parameters based on a duration between a first instance at which a respective wireless station (STA) of a plurality of STAs transmits or receives data and a second instance at which the respective STA enters a power-save mode and based on a quantity of the plurality of STAs having the duration greater than a value.

30. The wireless communication device of claim 29, wherein at least one indication of the one or more indications comprises a power management (PM) bit carried in a medium access control (MAC) frame, wherein the PM bit is set to 1.

31. The wireless communication device of claim 30, wherein the MAC frame is a quality-of-service (QoS) NULL frame.

32. The wireless communication device of claim 29, wherein at least one indication of the one or more indications comprises a PM bit carried in a medium access control (MAC) frame, wherein the PM bit is set to 0, and wherein the interface is further configured to:
obtain a Buffer Status Report (BSR) trigger frame that triggers the wireless communication device to transmit buffer status information upon exiting the power-save mode.

* * * * *